US010777097B2

(12) United States Patent
Kanuganti et al.

(10) Patent No.: US 10,777,097 B2
(45) Date of Patent: Sep. 15, 2020

(54) MEDIA STREAMING METHODS, APPARATUS AND SYSTEMS

(71) Applicant: AIRA TECH CORPORATION, La Jolla, CA (US)

(72) Inventors: Suman Kanuganti, San Diego, CA (US); Yuja Chang, San Diego, CA (US); Lawrence Bock, San Diego, CA (US)

(73) Assignee: AIRA TECH CORPORATION, La Jolla, CA (US)

(*) Notice: Subject to any disclaimer, the term of this patent is extended or adjusted under 35 U.S.C. 154(b) by 20 days.

(21) Appl. No.: 16/112,524

(22) Filed: Aug. 24, 2018

(65) Prior Publication Data
US 2018/0366029 A1  Dec. 20, 2018

Related U.S. Application Data

(62) Division of application No. 14/853,548, filed on Sep. 14, 2015, now Pat. No. 10,078,971.
(Continued)

(51) Int. Cl.
G09B 21/00 (2006.01)
H04M 1/725 (2006.01)
(Continued)

(52) U.S. Cl.
CPC ....... G09B 21/001 (2013.01); G06K 9/00624 (2013.01); G09B 21/003 (2013.01);
(Continued)

(58) Field of Classification Search
CPC .. G09B 21/001; G09B 21/006; G09B 21/003; G06K 9/00624; H04N 7/183;
(Continued)

(56) References Cited

U.S. PATENT DOCUMENTS 5,097,326 A   3/1992  Meijer et al.
5,973,618 A  10/1999  Ellis
(Continued)

FOREIGN PATENT DOCUMENTS

AU  2015311663 B2  6/2019
EP       3189655      7/2017
(Continued)

OTHER PUBLICATIONS

AU2015311663 , "Notice of Acceptance", dated Feb. 13, 2019, 3 pages.
(Continued)

Primary Examiner — Jared Walker
(74) Attorney, Agent, or Firm — Kilpatrick Townsend & Stockton LLP

(57) ABSTRACT

Techniques and systems are provided for assisting a user through a guidance mode activity. Such a user may be visually or otherwise impaired, or a user requiring help for other reasons. In some embodiments, a client device, held or worn by the user, may comprise a video capture device and several sensors, and may send video data and sensor data to a server. The server may comprise a processor and artificial intelligence. The server may send the video data and sensor data to an agent device. The agent device may provide content for display on an agent interface. An agent may view the agent interface, and assist the user in real time through audio instructions or other feedback.

17 Claims, 21 Drawing Sheets

Related U.S. Application Data

(60) Provisional application No. 62/045,300, filed on Sep. 3, 2014.

(51) Int. Cl.
    *H04N 21/258*     (2011.01)
    *H04N 21/4223*     (2011.01)
    *H04N 21/8545*     (2011.01)
    *H04N 21/2743*     (2011.01)
    *H04N 7/18*     (2006.01)
    *G06K 9/00*     (2006.01)

(52) U.S. Cl.
    CPC ...... *G09B 21/006* (2013.01); *H04M 1/72588* (2013.01); *H04N 7/183* (2013.01); *H04N 21/25841* (2013.01); *H04N 21/2743* (2013.01); *H04N 21/4223* (2013.01); *H04N 21/8545* (2013.01)

(58) Field of Classification Search
    CPC .......... H04N 21/8545; H04N 21/4223; H04N 21/2743; H04N 21/25841; H04M 1/72588; G01C 21/3647; G01C 21/3602; G01C 21/20
    USPC .......................................................... 348/62
    See application file for complete search history.

(56) References Cited

U.S. PATENT DOCUMENTS

| | | | |
|---|---|---|---|
| 6,046,712 A | 4/2000 | Beller et al. | |
| 6,115,482 A | 9/2000 | Sears et al. | |
| 6,301,050 B1 | 10/2001 | DeLeon et al. | |
| 7,194,148 B2 | 3/2007 | Yavitz et al. | |
| 7,656,290 B2 | 2/2010 | Fein et al. | |
| 7,864,991 B2 * | 1/2011 | Espenlaub | G09B 21/006 340/539.11 |
| 9,307,073 B2 | 4/2016 | Maxwell et al. | |
| 9,836,996 B2 | 12/2017 | Kanuganti et al. | |
| 10,078,971 B2 | 9/2018 | Kanuganti et al. | |
| 2004/0156554 A1 | 8/2004 | McIntyre | |
| 2007/0296572 A1 | 12/2007 | Fein et al. | |
| 2008/0043783 A1 | 2/2008 | Chai et al. | |
| 2008/0170118 A1 | 7/2008 | Albertson et al. | |
| 2010/0192110 A1 * | 7/2010 | Carter | G06F 3/011 715/865 |
| 2010/0208045 A1 | 8/2010 | Willmann et al. | |
| 2010/0245583 A1 | 9/2010 | Harel et al. | |
| 2010/0302980 A1 | 12/2010 | Ji et al. | |
| 2011/0072479 A1 | 3/2011 | Hsu et al. | |
| 2012/0162515 A1 | 6/2012 | Lee et al. | |
| 2012/0251012 A1 | 10/2012 | Ikai et al. | |
| 2013/0079061 A1 | 3/2013 | Jadhav et al. | |
| 2013/0155245 A1 * | 6/2013 | Slamka | G09B 5/14 348/158 |
| 2013/0332070 A1 * | 12/2013 | Fleizach | G01C 21/20 701/438 |
| 2014/0100773 A1 | 4/2014 | Cunningham et al. | |
| 2014/0218493 A1 | 8/2014 | Dialameh et al. | |
| 2015/0103154 A1 | 4/2015 | Candelore | |
| 2015/0103177 A1 | 4/2015 | Slamka | |
| 2015/0189071 A1 | 7/2015 | Maxwell et al. | |
| 2016/0063893 A1 | 3/2016 | Kanuganti et al. | |
| 2016/0219147 A1 | 7/2016 | Maxwell et al. | |
| 2017/0162076 A1 | 6/2017 | Kanuganti et al. | |
| 2018/0366029 A1 | 12/2018 | Kanuganti et al. | |

FOREIGN PATENT DOCUMENTS

| | | |
|---|---|---|
| EP | 3189655 A1 | 2/2020 |
| GB | 2545601 | 6/2017 |
| WO | 0103635 | 1/2001 |
| WO | 2016/037195 | 3/2016 |

OTHER PUBLICATIONS

CA2,959,425 , "Office Action", dated Jul. 2, 2019, 3 pages.
EP15839002.1 , "Office Action", dated Feb. 25, 2019, 5 pages.
U.S. Appl. No. 14/853,548, "Non-Final Office Action", dated Jan. 17, 2018, 15 pages.
U.S. Appl. No. 14/853,548, "Notice of Allowance", dated May 22, 2018, 9 pages.
U.S. Appl. No. 14/853,548, "Restriction Requirement", dated Oct. 3, 2017, 10 pages.
U.S. Appl. No. 15/432,863, "First Action Interview Pilot Program Pre-Interview Communication", dated May 23, 2017, 4 pages.
U.S. Appl. No. 15/432,863, "Notice of Allowance", dated Aug. 21, 2017, 9 pages.
AU2015311663, "First Examination Report", dated Mar. 2, 2018, 7 pages.
Bernard, Ophthalmic Photographers Society, Vision Sim, URL:http://www.opsweb.orgiblogpost/772200/163185/VisionSim, Apr. 26, 2013.
Bujacz et al., "Remote mobility and navigation aid for the visually disabled", Proc. 7th ICDVRAT with ArtAbilitation, Maia, Portugal, 2008, 2008, 263-270.
Dabney, "Aira at a Glance:Who We Are and What We Do Aira Medium", URL:https:jjmedium.com/aira-io/aira-at-a-glance-who-we-are-and-what-we-do 65ba346da1ec, Mar. 20, 2015.
EP15839002.1, "Extended European Search Report", dated May 24, 2018, 14 pages.
EP15839002.1, "Partial Supplementary European Search Report", dated Feb. 20, 2018, 16 pages.
Lamya et al., "Toward Designing Efficient Application to Identify Objects for Visually Impaired", IEEE Canada International Humanitarian Technology Conference (Ihtc), Jun. 1, 2014, pp. 1-7.
PCT/US2015/050012, "International Search Report and Written Opinion", dated Dec. 7, 2015, 12 pages.
PCT/US2015/050012, "International Preliminary Report on Patentability", dated Mar. 16, 2017, 10 pages.
CA2,959,425 , "Office Action", dated Feb. 26, 2020, 3 pages.
EP15839002.1 , "Notice of Decision to Grant", dated Jan. 10, 2020, 2 pages.
GB1705350.5 , "First Examination Report", dated Mar. 25, 2020, 4 pages.

* cited by examiner

| Label Name | Type | Show on Agent Dashboard | Detail |
|---|---|---|---|
| Profile Picture | Image | Yes | Could be imported from social media account |
| Name | Text Field | Yes | |
| Gender | Dropdown | No | |
| Age | Un-editable Label | Yes | |
| Languages | Set of Checkboxes | Yes | |
| Contact Information | Text Field | No | |
| Last Place Visited | Un-editable Label | Yes | Auto updated based on service history |
| Emergency Contact | Set of Text Fields | Yes | |
| Video Recording Consent | CheckBox | No (if not allowed, the video/camera button will be greyed out) | "In order to improve our service quality, we might record your session, please check the checkbox is you give us the permission to do so." |
| Impairment Details | Section of various | Yes | Nature of impairment<br>Cause of impairment<br>Length of impairment<br>Corrective equipment used |
| Preferences | Section of various | Yes | General preferences (food, walking, etc.)<br>Type of aid(s) currently used<br>Familiarity with technology (1 - 5 Scale)<br>Experience with specific user hardware (Yes/ No, if Yes, length)<br>Daily Aira usage pattern? (Morning/ Noon/ Afternoon/ Evening/ Night)<br>Main purpose in using Aira |
| Equipment | Section of various | No | Phone Model (Make/ Model)<br>Service Carrier<br>Data Plan availability and allowance rate<br>Personal Spot<br>Headphone, earpad, bluetooth availability |

*FIG. 6*

MEDIA STREAMING METHODS, APPARATUS AND SYSTEMS

CROSS-REFERENCE TO RELATED APPLICATIONS

This application is a division of U.S. application Ser. No. 14/853,548, titled "Media Streaming Methods, Apparatus, and Systems," filed on Sep. 14, 2015, which claims the benefit of U.S. Provisional Application No. 62/045,300, titled "Media Streaming Methods, Apparatus, and Systems," filed on Sep. 3, 2014, which are hereby incorporated herein by reference, in their entirety.

FIELD

The present invention relates generally to systems and methods of providing live remote assistance to visually or otherwise impaired people to guide them through various activities.

BACKGROUND

Visually and/or audibly impaired persons may be in search of solutions to make them independent in their daily tasks. They may wish to overcome stereotypes that blind or visually impaired people are incompetent and reliant on others. Integrated solutions that help impaired users with simple tasks (such as finding the nearest restroom or walking around a neighborhood) as well complex tasks (such as travelling alone using public transportation) may provide impaired users with the independence they seek. Solutions that work for impaired users may also have more general applicability to assist users in other situations.

SUMMARY

In some embodiments, a system may be used to provide remote assistance services to users with impairments or limitations. The system comprises a client device, such as user-wearable device, that acts as a companion to impaired or limited persons, such as partially or totally blind persons, deaf or hard-of-hearing persons, or persons with a combination of blindness and deafness. However, applications of embodiments disclosed herein are not limited to physically impaired users. More generally, embodiments may be useful to any person who requires assistance in performing a task. For example, remote assistance services may be provided to a person because he or she does not know the local language or is in a foreign country.

In some examples, the client device can stream live video over a network to a remote assistance server (or remote server). The network may include, for example, a cellular network, a satellite network, a Bluetooth network, a WiFi network, or other suitable network. In some embodiments, the remote server may include artificial intelligence (AI). The AI may be comprised of various engines that can remotely assist a user while the client device is in a guidance mode. In some embodiments, the client device streams live video data to a live agent device in addition to, or instead of, streaming the video data to a remote server. The live agent may then use the live agent device to provide feedback to the client device in order to guide the user through various activities. For example, the feedback may include audible feedback, haptic feedback, or any other suitable feedback that helps to guide the user. In some embodiments, the client device may store the video data locally. For example, the client device may store video data locally due to an absence of an active network connection to stream the video data to the remote server and/or the live agent device. In another example, the client device may store the video data locally in addition to streaming the video data across an active network to the remote server and/or the live agent device.

Some embodiments are directed to apparatuses, systems, and methods that can be used for providing assistance to visually impaired users. For example, an apparatus may comprise a storage device that stores a user profile of a user of the apparatus. For example, a user profile may include information about a visual impairment of the user or may include a unique user ID that allows information about a visual impairment to be looked-up by another device. The apparatus may also include a video capture device (e.g., a camera, a depth sensor, or other suitable capture device or combination of video capture devices) that is configured to and may capture video data of the environment surrounding the apparatus. Further, the apparatus may comprise a video coding device that is configured to and may compresses captured video data. The apparatus can also include one or more sensors, including a location sensor. The apparatus can also include a processor and an output device. The processor can receive input corresponding to activation of a guidance mode, and then generate a guidance request in response. The processor can provide the guidance request, compressed video data, and sensor data to a server, to a live agent device, or to both a server and a live agent device. The processor can also be configured to and may receive and output guidance feedback data. In some aspects, the output device may be configured to provide an audible feedback output, a haptic feedback output, or other suitable output.

In some aspects, the processor can stream the compressed video data as a live video stream to the server and/or the live agent device as the video is captured and compressed. In some aspects, the processor can be configured to implement a privacy mode in which the video capture device is disabled from capture video.

In some aspects, the processor can be further configured to implement a local mode, in which the guidance request, the compressed video data, and the sensor data are analyzed locally by the processor to provide one or more guidance feedback instructions. Such a local mode can be implemented in response to detecting a low network condition, in response to the processor detecting a battery level as being lower than a threshold, upon receiving an input, or in response to other triggering event. One example of such a system or apparatus may comprise a wearable device, an Internet of Things (IoT) device, and/or a personal mobile device of a visually-impaired or other-wise impaired user.

Some embodiments are directed to systems and methods for facilitating remote assistance for visually-impaired users. Such a system can comprise one or more processors. The one or more processors may comprise, or be part of, several engines such as: a navigation engine that is configured to and may determine navigation data based on the location data; an identification engine that is configured to and may identify one or more objects based on the video data; a learning engine that is configured to and may identify patterns of a user of the client device; an emergency engine that is configured to and may determine an emergency event associated with the user of the client device; and an agent engine that is configured to and may determine whether to transfer remote assistance for the user to one or more live agents. The navigation engine can be further configured to determine navigation data including orientation and mobility data. Some embodiments may also include a health monitor engine, which is configured to and may monitor health of the user based on health data. Some embodiments may also include an integration engine, which is configured to and may integrate remote assistance with one or more external services like a transportation service, a shopping service, a restaurant service, a utility service, or other suitable service. In some embodiments, the identification engine can be further configured to recognize a person from facial features detected in the video data.

The processors are configured to and can obtain video data captured by a client device. The video data may include images of an environment in which the client device is located. The processors can also be configured to and may obtain sensor data from the client device. The sensor data may include at least location data indicating a location of the client device.

Some embodiments are directed to methods, apparatuses, and computer readable media having stored thereon instructions that when executed by a processor perform methods that include providing filtered information for display. In some embodiments, video data can be accessed from an agent device. The video data can include images of an environment in which a client device is located. Profile information of a user of the client device may be accessed, and a visual impairment of the user may be determined using the profile information. A mask may be applied to the video content based on the determined visual impairment to generate filtered video content. The mask may filter the video content to generate the filtered video content in a format representative of the visual impairment. The filtered video content can then be provided for display on the agent device.

In some embodiments, such an application of a mask can be in response to receiving an input corresponding to the selection of a mask icon displayed on the agent interface.

Some embodiments of the invention are directed towards methods, systems, and computer readable media having stored thereon instructions that when executed by a processor perform methods that include providing an agent interface such as a dashboard for remote assistance of visually impaired users. In such embodiments, video data may be accessed from an agent device. The video data can include images of an environment in which a client device is located. Sensor data including location information of a client device may also be accessed from the agent device. Video content based on the video data may then be provided for display in a first region of the agent interface. The video content may provide a live view of the environment from a perspective of the client device. A map object based on location information of the client device may be provided for display in a second region of the agent interface. The map object may indicate a location and/or an orientation of the client device (and thus the visually impaired user of the client device) on the map.

In some embodiments, one or more control objects may be provided for display. The control objects can include, for example, a camera object, a video object, or a combination of both the camera object and the video object. Selection of the camera object may initiate transmission of a first signal to the client device, the first signal causing a camera on the client device to capture an image. Selection of the video object can initiate transmission of a second signal to the client device, the second signal causing the camera on the client device to record a video.

In some embodiments, a compass view can be overlaid over the video content. The compass view can include a compass overlay displayed over the video content. The compass overlay may include a number of degrees from a perspective of the client device to a location in the environment or an object located in the environment.

In some embodiments, in addition to or instead of the compass view, a distance view can be overlaid on the video content. The distance view can include a distance overlay displayed over the video content. The distance overlay can include a distance to a location in the environment or an object located in the environment. In some examples, the distance may be measured as a number of steps that the user of the client device would have to take to reach the location or the object or to reach an area around the location or the object (e.g., within a certain amount of steps from the location or object).

In some embodiments, a user profile icon may be provided for display. Selection of the user profile icon may cause user profile information to be displayed.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF THE DRAWINGS

Illustrative embodiments of the present invention are described in detail below with reference to the following drawing figures:

FIG. 6 is an example table of information that may be stored in a user profile, according to embodiments.

DETAILED DESCRIPTION

Figure 1:
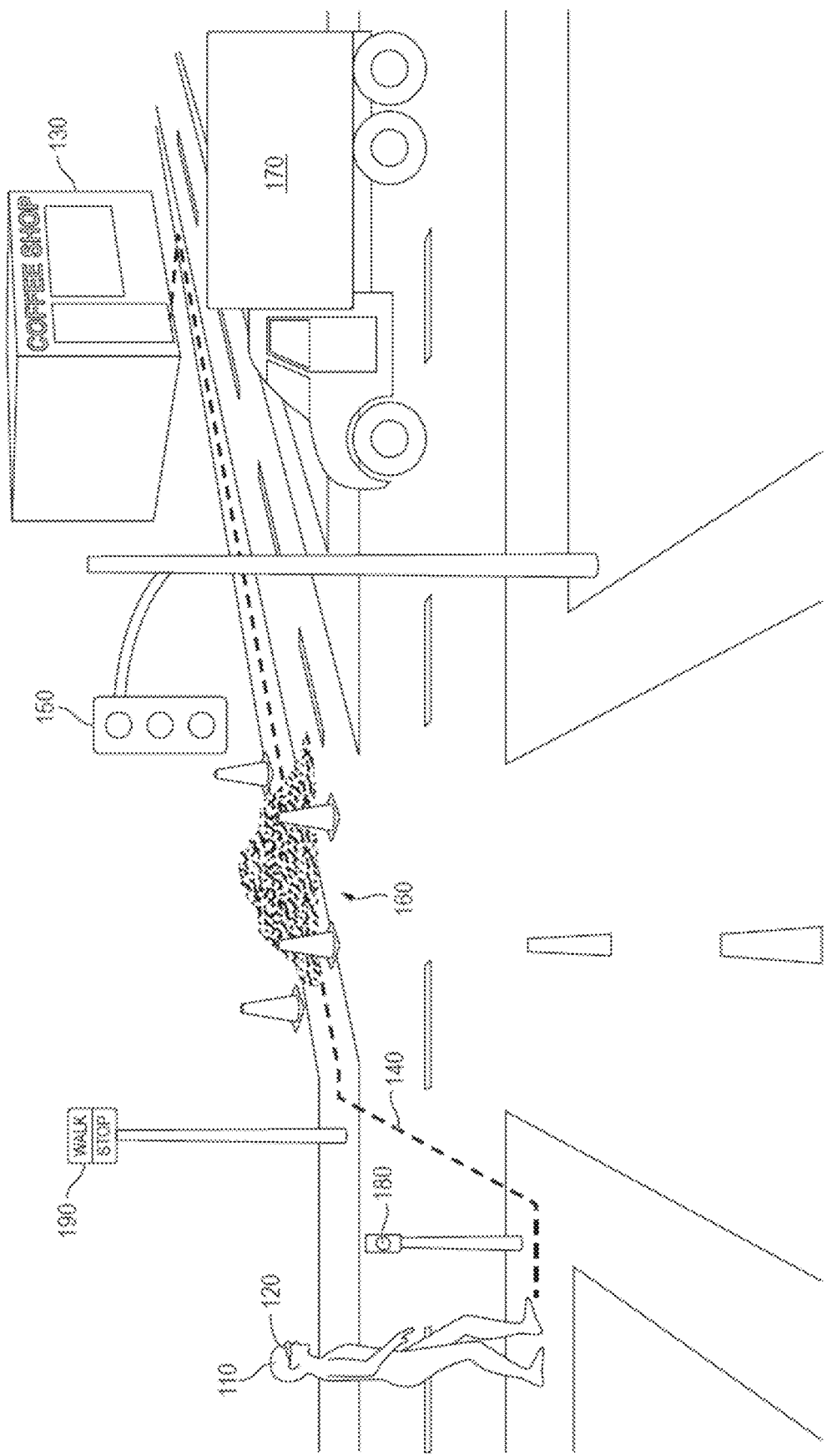
FIG. 1 is a simplified illustration of a scene during application of various embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

The following detailed description together with the accompanying drawings in which the same reference numerals are sometimes used in multiple figures to designate similar or identical structures structural elements, provide a better understanding of the nature and advantages of the present invention.

FIG. 1 is a simplified illustration of a scene during application, by a visually impaired user, of one non-limiting example situation where embodiments may be used. Scene 100 depicts an example real-life scenario where embodiments described herein may be advantageously used by a visually-impaired person to reach his or her destination. In the example, a person 110 may require assistance to reach a destination 130. Person 110 may be a visually impaired person (including totally or partially blind), otherwise physically impaired person, or a person who requires assistance for some other reason such as linguistic or other unfamiliarity. A portable electronic, such as a wearable device 120, may be used to provide the person 110 with assistance. The wearable device 120 can include a camera, a microphone, and earphones and may provide live or automated assistance to the person 110. For example, a remote assistance server with artificial intelligence (AI) may be connected to the wearable device 120 over a network, and may provide automated assistance to the person 110. In another example, one or more live agents may be connected to the wearable device 120 over a network, and may provide live instructions to the person 110. In some examples, both the server with the AI and the one or more live agents may be connected to the wearable device 120 via a network. In some examples, the wearable device 120 may provide automated assistance to the person 110.

In one example, the wearable device 120, the server with AI capabilities, and/or the one or more live agents may help navigate the person 110 to the destination 130. The person 110 may be directed or instructed to walk along path 140, including crossing the street upon pressing a walk button 180, when the walk light 190 is on. The person 110 may then be instructed to turn to face a 2 o'clock position, to avoid construction work 160 and other obstacles, to account for a speeding truck 170 that has run a red light of the traffic signal 150, and may be provided with any other appropriate instruction to reach the destination 130, as shown in the figure.

In the example shown in FIG. 1, the visually impaired person 110 may be guided by a live agent with access to an agent device receiving a live, real-time video feed of the point of view of the wearable device 120. During an assisted or guided mode activity or session, the live agent may provide feedback to the person 110 to assist the person in reaching the destination 130 safely, independently, and with confidence. Various examples of systems and techniques of providing assistance to users are provided herein.

Figure 2:
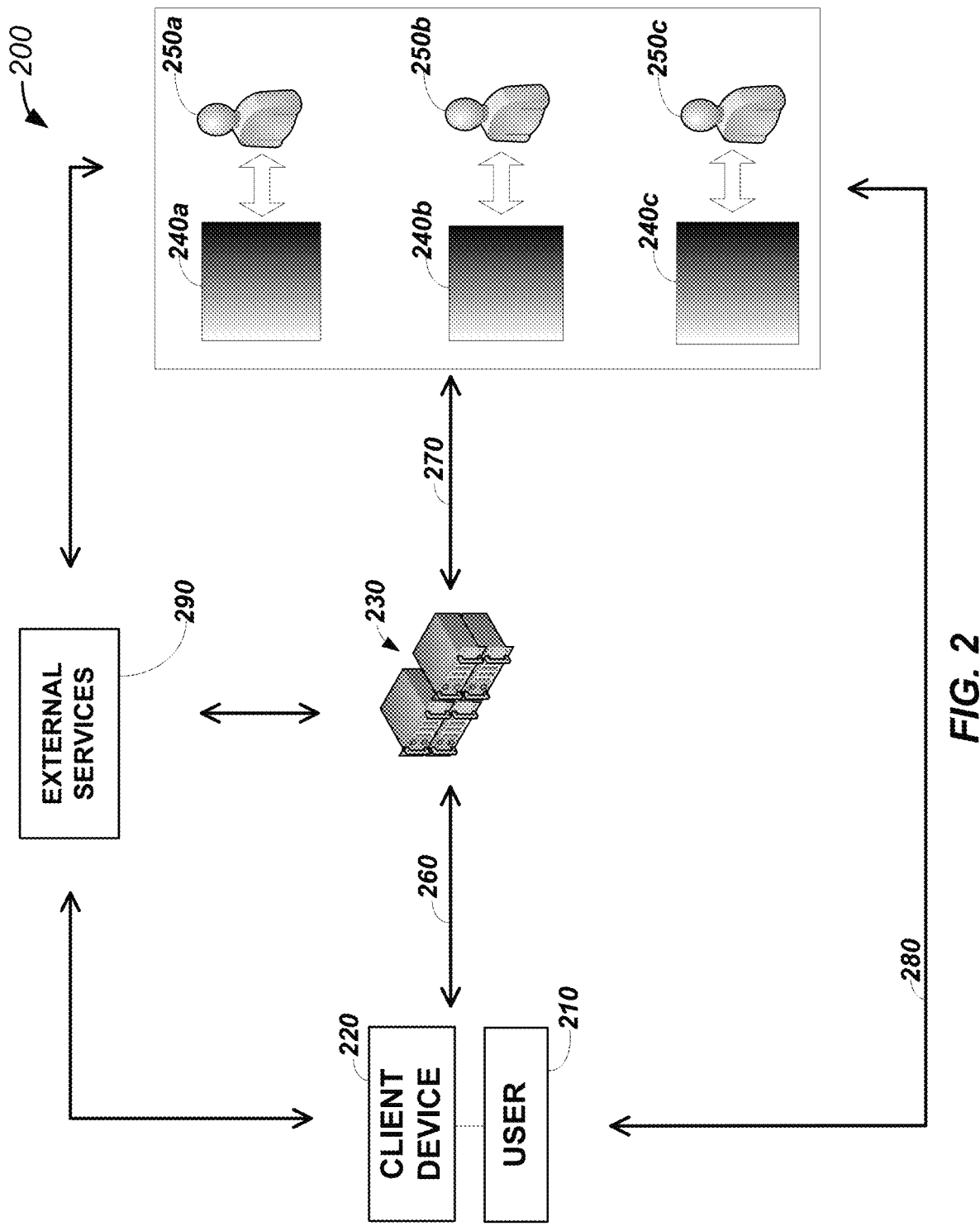
FIG. 2 is a simplified block diagram depicting components of a system utilizing various embodiments.

FIG. 2 provides an illustration of a remote assistance system 200 for providing assistance to one or more users. For example, the system 200 may be used to implement the example shown in FIG. 1. In the figure, user 210 may be a visually or otherwise impaired person, or a person who requires assistance. A client device 220 may be used to provide assistance the user 210. In some examples, the client device 220 may be a wearable device, such as wearable device 120. In some examples, the client device 220 may be a hand-held device. More details of an example client device 220 will be provided below, but client device 220 can include at least one video capture device, such as a camera, along with other components. The video capture device or devices may continuously capture video images of the scene or environment surrounding user 210, and the client device 220 may compress and send a video feed to a remote assistance server 230 over a network 260 and/or to one or more agent devices 240a-240c over the network 280. In addition, client device 220 may also include one or more sensors. Sensor information, such as location information, may also be sent to server 230.

Networks 260 and 280 may be a wired or a wireless network. Further, networks 260 and 280 may be a Local Area Network (LAN), a Wide Area Network (WAN), or a Personal Area Network (PAN). Networks 260 and 280 may utilize technology such as cellular including LTE, CDMA, GSM, or other technology such as WiFi, MVNO, optical fiber, WiMax, or Bluetooth. In some embodiments, the cellular network may belong to a private provider, and may be leased by the user or the provider of the remote assistance service. In some embodiments, the network may be operated by the provider of the remote assistance service. In some embodiments, the networks 260 and 280 may be a common network, such as the Internet or a common WAN. In some embodiments, the networks 260 and 280 may be separate networks, such as separate LANs, separate WANs, or separate PANs.

In some embodiments, server 230 may include artificial intelligence (AI). The AI may be used to control a guided mode operation, assisting the user 210 by providing feedback to the client device 220. In such embodiments, the server 230 may analyze a live video feed from the client device 220 without utilizing help from live agents 250a-250c. In some embodiments, as in the local mode of operation, which will be described later, the video feed may be analyzed locally at client device 220 itself.

In some embodiments, the server 230 may send the video feed and sensor data received from the client device 220 to an agent device 240a, 240b, or 240c over network 270 for use by an agent 250a, 250b, or 250c. In some embodiments, the server 230 may also facilitate a communication session between the user using the client device 220 and an agent 250a, 250b, 250c using one of agent devices 240a, 240b, or 240c. The communication session may include a phone call, a text messaging communication, messaging through social networks, messaging through applications, or other suitable communication. The agent 250a, 250b, or 250c may then provide remote assistance through the communication session, such as using a telephonic communication. For example, a phone call may be conducted between the agent device 240a, 240b, or 240c and the client device 220 using any suitable telecommunications systems, such as using a cellular network, Voice over Internet Protocol (VoIP), or other suitable telecommunication system. In some embodiments, such a phone call may be placed directly by the user 210 from the client device 220 to an agent device 240a, 240b, or 240c. In such embodiments, the user 210 may prefer to skip being assisted by the AI of the server 230, and may prefer instead to talk to the agent 240a, 240b, or 240c directly. The server 230 may then be bypassed, and the agent 240a, 240b, or 240c may provide guidance feedback directly to the user 210 through the client device 220.

An agent, and the agent device that the server 230 or client device 220 interact with, may be selected intelligently from a set of available agents and agent devices. In the example shown in FIG. 2, one or more agents may be selected from agents 250a, 250b, and 250c, and the corresponding agent devices from agent devices 240a, 240b, and 240c. In embodiments, control of remote assistance can move from one agent to another, or from the server 230 to one or more agents, or from one or more agents to the server 230. In one example, the user 210 may have a preference for a Spanish speaking agent. The preference may be stored in a user profile of the user. Agent 250b may be a Spanish speaking agent, but agent 250b may be busy assisting a different user. Hence, based on availability, server 230 may select agent 250a to assist the user although agent 250a may have limited Spanish language ability. However, when agent 250b becomes available, the server 230 may request agent 250a to redirect control to agent 250b. In some embodiments, the server 230 may send data including video data and sensor data to an agent management device (not shown). The agent management device may choose an agent from the pool of available agents 250a, 250b, and 250c. In some embodiments, a user may prefer an agent who is part of his or her family, an agent who is a friend, or an agent experienced in certain kinds of shopping or other subject.

In some embodiments, server 230 can include a processor, memory and program code that resides in the memory and is executed by the processor. The program code can include multiple modules or engines that enable the processor to perform the functionality described herein. More detail regarding the server 230 will be provided below.

In some embodiments, an agent device (e.g., agent device 240a, 240b, or 240c) may be connected to an agent interface (not shown). An agent interface may provide several pieces of information that can be utilized by the agent, including live video feed from the client device 220, various control objects, and various other information. The agent interface will be described in further detail below.

Similar to networks 260 and 280, network 270 may also be a wired or a wireless network. Further, network 270 may be a Local Area Network (LAN) or a Wide Area Network (WAN). Network 270 may utilize technology such as cellular including LTE, CDMA, GSM, or other technology such as WiFi, optical fiber, WiMax, MVNO, or Bluetooth. In some embodiments, the cellular network may belong to a private provider, and may be leased by the user or the provider of the remote assistance service. In some embodiments, the network may be operated by the provider of the remote assistance service. In some embodiments, two or more of the networks 260, 270, and 280 may be a common network, such as the Internet or a common WAN. In some embodiments, two or more of the networks 260, 270, and 280 may be separate networks, such as separate LANs, separate WANs, or separate PANs.

In some embodiments, an agent (e.g., agent 250a, 250b, or 250c) may use an agent device (e.g., agent device 240a, 240b, or 240c) to provide guidance feedback to the client device 220, based at least in part on the agent interface display. The client device 220 can then provide the guidance feedback to the user 210. Such feedback may be more nuanced and personalized than an automated navigation guidance using artificial intelligence in the client device 220 or the server 230. Using guidance feedback from an agent device, the user 210 may be able to complete an activity or task more efficiently than in the absence of the feedback. The guidance feedback may include verbal feedback, haptic feedback, tonal feedback, or other suitable feedback.

In some embodiments, at least one of the client device 220, the server 230, or the agent devices 240a, 240b, or 240c may be connected to a host of external services 290 through one or more networks. Examples of external services 290 may include a transportation service such as a taxi service, a shopping service, an emergency health service, a shopping service, a public transport schedule service, or a restaurant service. During the course of a guidance mode operation, an agent, the user, or the server may decide to contact an external service for assistance.

For example, an agent may realize that his agent device has lost communication with the client device 220 over a period of time, such as two minutes. During that time, the agent device may have no access to video, audio, or sensor data from the client device 220. The agent may then decide to contact an external service such as UBER™ to have a taxicab sent to the last known location of the client device 220. As another example, an agent may observe through the agent interface that the user 210 may require health assistance. In such a situation, the agent, or the user 210 through the client device 220, may contact an ambulance service.

Some examples of processes and systems for initiation of guidance requests, transfer of information and control, and intelligent navigation will be described below, according to various embodiments. It should be noted that none of the examples is meant to be limiting.

Figure 3:
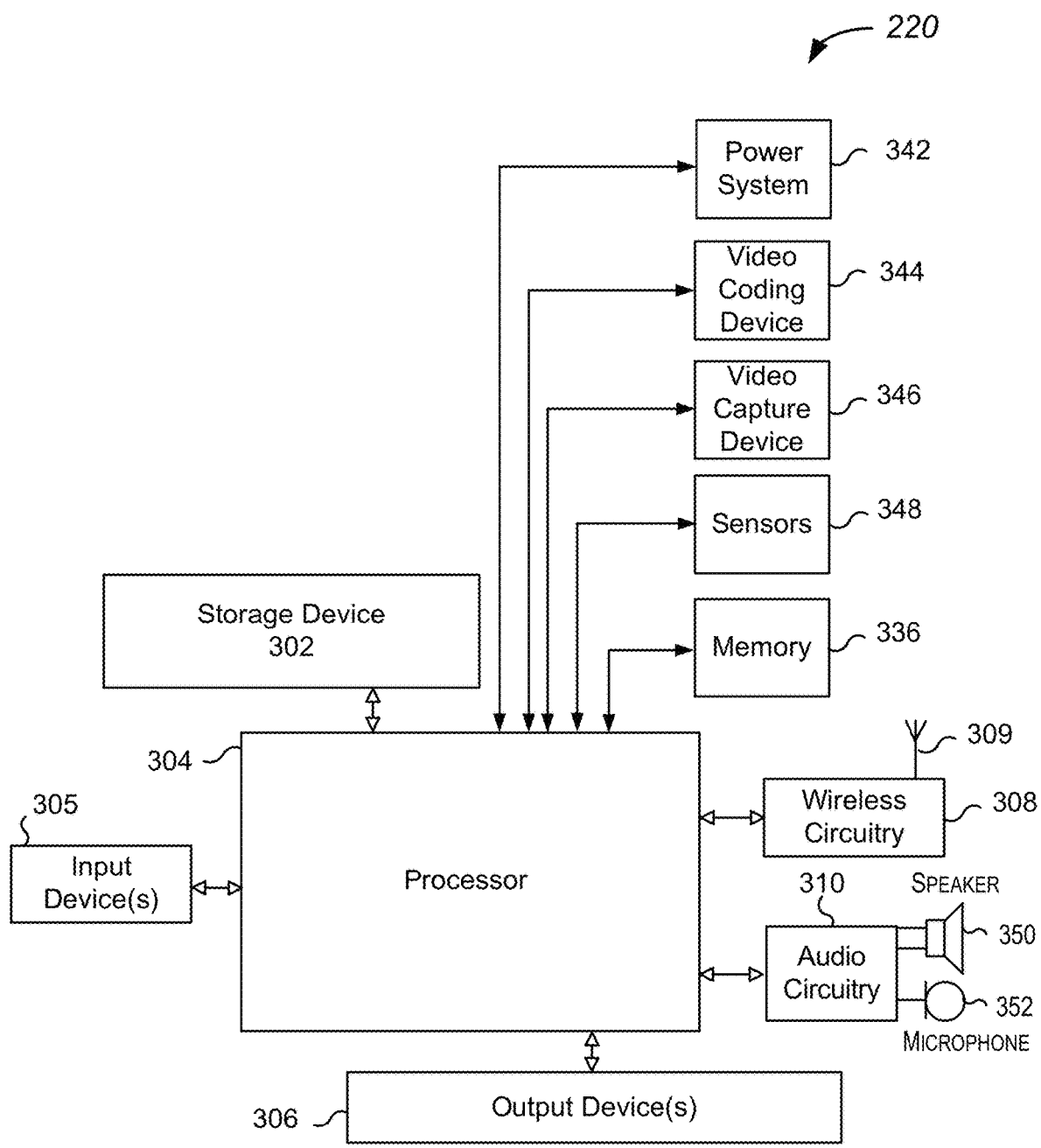
FIG. 3 is a block diagram illustrating components of an example of a client device according to embodiments.

FIG. 3 is a block diagram illustrating components of an example client device 220 according to embodiments. One of ordinary skill in the art will appreciate that the hardware configuration of client device 220 shown in FIG. 3 is an example, and that the client device 220 is not limited to the hardware configuration depicted in FIG. 3, or any particular hardware configuration.

In various embodiments, the client device 220 can be a wearable device (e.g., wearable eye glasses, a wearable watch, a fitness tracker or other Internet of Things (IoT) device, a Bluetooth headset, or the like), a personal device (e.g., a mobile smartphone, a mobile tablet, or the like), or other suitable client device. In some embodiments, client device 220 can be a wearable personal device that may be specially manufactured and configured to interact with the rest of a system, such as system 200. Client device 220 can include a processor, such as processor 304 that controls the operation of device 220 by executing computer instructions stored in a computer readable medium 336, such as a random access memory (RAM), a read only memory (ROM) and/or a programmable read only memory (PROM). The computer instructions can be part of one or more software applications stored on the computer readable medium 336 or another memory or storage device including an operating system and one or more application programs that can be executed by processor 304 to carry out the functionality described below.

As shown in FIG. 3, in addition to memory 336, the client device 220 can also include a storage device 302 in addition to memory 336. Storage device 302 can be non-volatile storage (e.g., a hard-disk drive (HDD) a solid-state drive (SSD), or other suitable non-volatile storage), a memory card (e.g., an SD card, a MicroSD card, a MultiMediaCard (MMC), a CompactFlash card, or the like), or other suitable storage medium. The storage device 302 may be used to store one or more user profiles of a user or a group of users. Such user profiles may include information describing an impairment or limitation of the user, such as a visual impairment, an audible impairment, a combination of visual and audible impairments, language limitations, or any other impairment or limitation. Example user profiles will be described in further detail in connection with FIG. 6. Storage device 302 may also be used to store applications, such as applications that may be activated to initiate a guidance request. In some embodiments, instead of or in addition to storing a user profile locally, storage device 220 stores a unique ID (e.g., a serial number or user ID) that can be used to look-up user profile information stored at server 230, at one or more of the agent devices 240a-240c and/or at another location accessible to the agent devices. Additionally, in some embodiments, storage device and memory 336 can be a single memory or storage device.

The client device 220 may also include one or more video capture devices, such as video capture device 346. A video capture device may include, for example, a video camera attached to client device 220 that captures video data of an environment in which client device 220, and hence user 210, is located. The video data may include a sequence of video frames or pictures. In addition, video capture device 346 may include optical or digital lenses. Client device 220 can include more than one video capture device. For example, two video cameras may be used to capture video data such that a three-dimensional view may be reconstructed from data obtained from the two cameras. In another example, more than one video camera may be used to capture various perspectives at different angles from client device 220. In some embodiments, in addition to a standard video camera, the video capture device 346 can include an infra-red camera that can capture images and data that is not visible to a human eye. In some examples, the infra-red camera may be used to detect emotions of one or more people within range of the infra-red camera. The client device 220 can also include a video coding device 344. The video coding device 344 can include a video encoder that can compress the video data captured by the one or more video capture devices. Video coding device 344 can also include a video decoder that can decode video data captured by the one or more video capture devices, or video data received from another source.

In some embodiments, client device 220 has a form factor similar to a pair of eye glasses. For example, client device 220 can include a frame having a frame front, first and second lenses supported within the frame front, and first and second temples that extend from the frame front over a user's left and right ears, respectively. Video capture device 346 can be attached to or built into the frame such that the video capture device is pointing in the same direction the user is looking.

Power system 342 of the client device 220 can include a rechargeable battery, a standard battery or other power source that provides a power supply for client device 220 to function. When client device 220 includes a rechargeable battery, power system 342 can also include circuitry to recharge the battery along with a connector that can receive power from an external power supply. The connector can include multiple contacts such as a power contact, ground contact and one or more data contacts that enable data to be transferred to client device 220. In some embodiments, client device 220 can include a wireless charging system, such as an inductive charging system, to recharge its battery.

The client device 220 can also include wireless circuitry 308, which may comprise one or more wireless transceivers (e.g., including a wireless receiver and a wireless transmitter) and/or one or more antennas 309 to send and receive data wirelessly across a network. Multiple wireless transceivers and antennas may be included in the client device 220. For example, a separate wireless transceiver and antenna may be provided for different wireless technologies, such as cellular (e.g., CDMA, TDMA, LTE, OFDM, or other suitable cellular communication technology), WiFi, Bluetooth™, Zigbee™, or other suitable commercial or proprietary wireless technology.

Client device 220 can further include one or more sensors 348. One or more sensors 348 can include a location sensor, such as a position locator (e.g., a Global Positioning System (GPS) sensor, an Estimote sensor, a location Beacon, an iBeacon sensor, or other suitable location sensor), an altimeter, a gyroscope, a magnetic compass, an impact sensor, an accelerometer, an infra-red sensor, an ambient light sensor, a motion sensor, a gesture sensor, a temperature sensor or thermometer, or any other suitable sensor. The one or more sensors 348 can include any one of these sensors or a combination of two or more of these sensors.

In some examples, at least one of the one or more sensors 348 includes a location sensor. For example, the one or more sensors 348 can include a GPS sensor. A GPS sensor can locate location coordinates of the client device 220 using information received from one or more GPS satellites. The location of the client device 220 based on the location coordinates can be placed on a map. In another example, the one or more sensors 348 can include a location sensor that determines the location of the client device 220 based on one or more WiFi signals (or other communication signal) received from a WiFi device. For example, the location sensor can determine the location of the client device 220 by performing triangulation or trilateration using the WiFi signals. The location coordinates of the client device 220 can be collected using the one or more sensors 348 at various points in time. For example, the location of the client device 220 can be determined at every iteration of a time interval (e.g., every 30 seconds, every minute, every two minutes, or any other suitable time interval) to track a pattern of motion of the client device 220 (and thus the user 210).

In some examples, the one or more sensors 348 can include other sensors in addition to the location sensor or position locator. For example, the one or more sensors 348 can include an accelerometer. The accelerometer measures acceleration of the client device 220. The accelerometer can include a single-axis or a multi-axis accelerometer, and can be used to detect a magnitude and a direction of the measured acceleration as a vector quantity. The accelerometer can be used for various applications, such as to sense orientation of the client device 220 due to direction of weight changes, to coordinate acceleration of the client device 220, to detect vibration, shock, and falling in a resistive medium experienced by the client device 220. Input received from the accelerometer can be used to determine, for example, when a user begins to move from rest, or when a user comes to a stop. The one or more sensors 348 can also include a magnetometer, a gyroscope, or an oscilloscope to determine an orientation of the client device 220, and hence, the user 210.

The one or more sensors 348 can also include a proximity sensor that can detect an object without making physical contact with the object. For example, the proximity sensor can include a capacitive proximity sensor, a photoelectric proximity sensor, an inductive proximity sensor, or other suitable proximity sensor. The proximity sensor can transmit an electromagnetic field or a beam of electromagnetic radiation (e.g., an infrared signal), and can detect changes in the electromagnetic field or can detect a return signal. The proximity sensor can be used, for example, to detect an object within a certain proximity to the client device 220. The proximity is dependent on the range of the proximity sensor. In one example, a proximity sensor can be used to detect dangerous conditions or obstacles in a path of the user 210 during navigation from one location to another location.

The client device 220 can also include one or more input devices 305 and one or more output devices 306. For example, input devices 305 can include one or more of a keyboard, a keypad, a touchscreen, an audio input with voice recognition software as well as a variety of other input devices that the user 210 may use to provide input to the client device 220. The output device 306 can include one or more displays, one or more audio outputs, one or more haptic feedback output devices, one or more peripheral ports for connecting peripheral devices, or any other suitable output device. In some examples, the one or more audio inputs and/or outputs can be separate from input devices 305 and output devices 306, such as the audio circuitry 310 and speaker 350 shown in FIG. 3. A haptic feedback output device can be used by the visually or otherwise impaired user 210 to interact with the client device 220 through taps and vibrations.

Processor 304 can receive input corresponding to the activation of a guidance mode. Such an input may be received from an input device of the client device 220 in response to a request from the user 210. For example, the user may request the guidance mode using an input of the client device 220, such as a touchscreen input, a keypad or keyboard input, a voice command, or any other suitable input. Processor 304 can also be configured to and may receive the compressed video data from video coding device 344 and sensor data from the one or more sensors 348. Upon receiving the guidance mode input request, the processor 304 can act on the request by generating a guidance request. The processor 304 can then provide the guidance request, the compressed video data, and the sensor data to the server 230, an agent device 240a, 240b, 240c, or both the server 230 and the agent device 240a, 240b, 240c. To communicate with the server 230 or the agent device 240a, 240b, 240c, the device 220 can utilize wireless communication circuitry such as wireless circuitry 308.

Processor 304 can receive guidance feedback data from either the server 230, an agent device 240a, 240b, 240c, or both from the server 230 and the agent device 240a, 240b, 240c through, for example, wireless circuitry 308. Upon receiving guidance feedback data, the processor can communicate such data to one or more of the output devices 306 and/or to the audio circuitry 310. For example, the output devices 306, as described above, can include one or more displays, one or more audio outputs, one or more haptic feedback output devices, one or more peripheral ports for connecting peripheral devices, or any other suitable output device. In examples in which the user 210 is visually impaired, the guidance feedback data can be output to the user 210 through an audio output, a haptic feedback output device, or a peripheral device connected to a peripheral port. In one example, guidance feedback data can be output using the audio circuitry 310, which is shown separately from the output device 306 in FIG. 3. The audio circuitry 310 can be connected to a speaker 350 (or to headphones connected to a peripheral port of the client device 220) and a microphone 352. Such audio components can be used to communicate an audio output to the user 210. For example, the audio output can include the received guidance feedback data.

Figure 4:
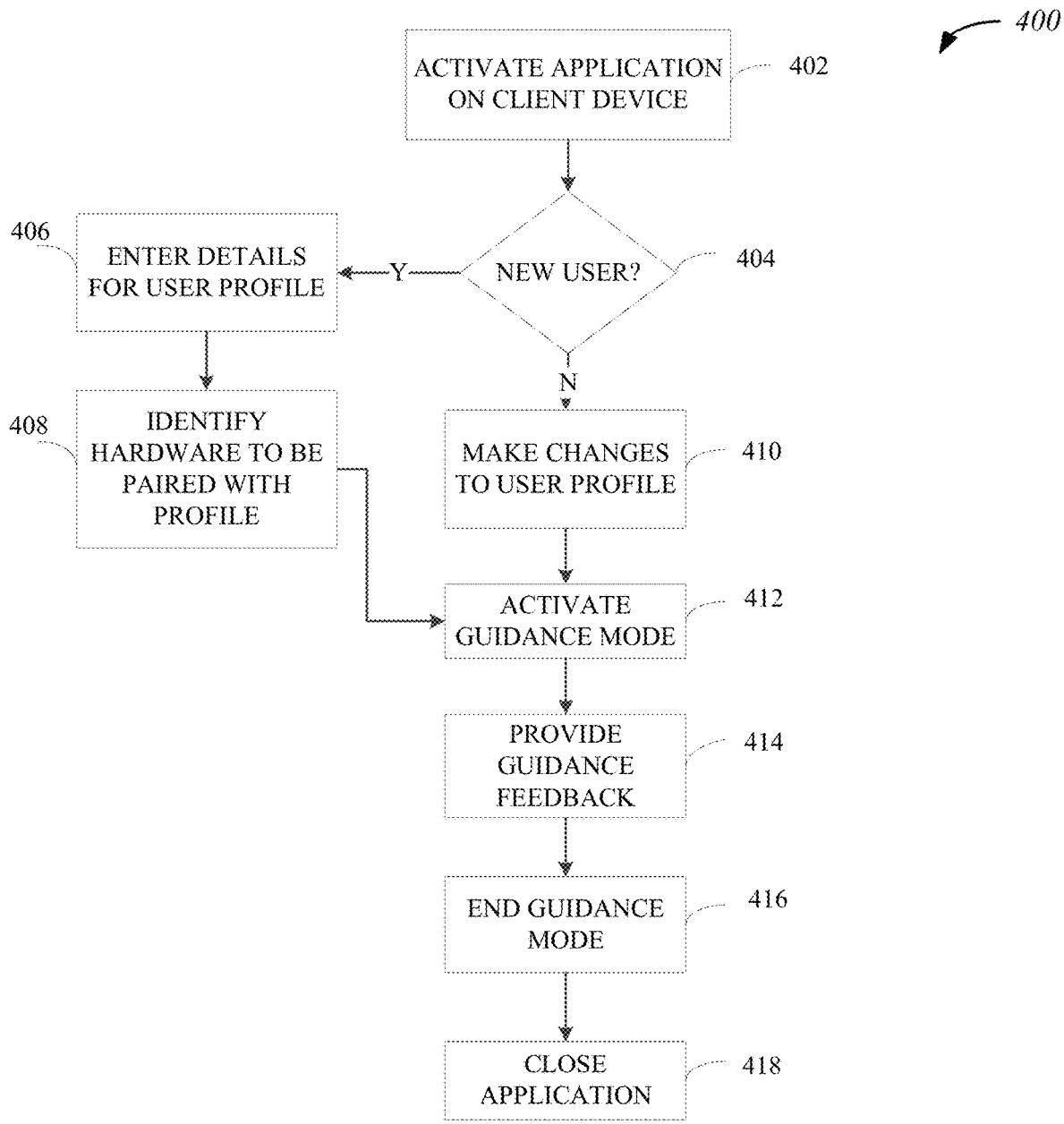
FIG. 4 is a flowchart illustrating an example of a process performed at a client device, according to embodiments.

FIG. 4 is a flowchart illustrating an example of a process 400 performed at a client device, such as client device 220, according to embodiments. The process 400 may be initiated and begin when a visually impaired (or otherwise impaired or limited) user provides input to the client device 220 requesting a guidance mode to obtain assistance from a system, such as the system 200.

At step 402, an application can be activated on the client device, triggering the initiation of a guidance request. Such an application can, for example, be made available for download on the client device by a provider of remote assistance services. The application can be launched in a number of ways. For example, a user of the client device can launch the application using an input of the client device 220, such as a touchscreen input, a keypad or keyboard input, a voice command, or any other suitable input that launches the application. In one example, the user can perform a gesture or movement that triggers the application to be launched. For example, the user may place the client device on the user's face (in which case the client device may be a wearable device). The application can launch when the user lifts his or her head by a predetermined amount (e.g., 20 degrees, 30 degrees, 45 degrees, or other suitable angle). In another example, the user can attach the client device to the user's hand or hold the client device in the user's hand. The user can then perform a predefined gesture (e.g., holding a thumbs up sign that can be seen by a camera of the phone) that causes the application to be launched. In another embodiment, the user can launch the application using voice commands, such as by speaking a predefined command that the client device recognizes.

At step 404, once the application is launched, the client device can determine whether the user of the client device is a new user. For example, the client device 220 can determine whether a user profile exists for the user. If the user is a new user, the client device can interact with the user to create a locally stored user profile. For example, at step 406, the client device can prompt the user to enter details for a user profile for the user. The client device, for example, can audibly instruct the user to enter user profile details by providing audio output through a speaker or a peripheral port with connected headphones. In some embodiments, such a user profile may be stored additionally, or instead, on a remote server (e.g., server 230) or in a separate cloud server. At step 408, the client device can identify hardware to be paired with the user profile. For example, the client device can identify different client devices that a user has used in the past or is likely to use in the future, and can pair or link the user profile with the different client devices. The user profile can include information identifying the different client devices associated with the user. The user profile can then be paired or linked with the different client devices associated with the user. In some embodiments, multiple user profiles can be locally stored on the client device, such as different user profiles for different users of the client device. Step 408 is optional, and may be omitted from the process 400 in some embodiments.

The user profile of the user of the client device can include information describing details regarding an impairment of the user. For example, the user profile can include information describing that the user is partially blind in the left eye and fully blind in the right eye. Further details regarding user profiles will be described with reference to FIG. 6 below.

At step 410, in the event the user is not a new user (e.g., if a user profile already exists for the user), the client device can prompt the user to make changes to his or her user profile. For example, the prompt to make changes to the user profile may be provided when the user logs in to the user's account. As a user gets more familiar with the client device and the remote assistance process, the user may tune his or her profile to match his or her interests. The client device can also intelligently update a user's profile based on learning from the user's behavior over time. Step 410 is optional and can be omitted from the process 400 in some embodiments. Further details relating to user profiles is described below with respect to FIG. 6.

At step 412, the client device may activate the guidance mode, for example, by touching a dedicated "Guidance Mode" input button or by a voice activated command. Activation of the guidance mode may be followed by the client device outputting guidance feedback through the client device to the user at step 414. The guidance feedback may be provided by the client device itself, from the server 230, or from one or more agent devices 240a, 240b, 240c. More detail on the operation of the guidance mode is provided below.

At step 416, the client device can end the guidance mode. For example, once a user has performed a guided activity based on the guidance feedback, the user can provide input to the client device instructing the client device to end the guidance mode. In another example, the client device may automatically end the guidance mode once it detects that an activity has been completed. At step 418, the client device can close the application. For example, the user can provide input to the client device instructing the client device to close the application. In one example, the user can close the application using a gesture input or an input of the client device 220, such as a touchscreen input, a keypad or keyboard input, a voice command, or any other suitable input that launches the application. Once the application is closed, the client device can be disconnected from the server 230 or a live agent 240a, 240b, 240c.

In some embodiments, in addition to, or instead of, activating an application on the client device, the user can place a telephone call to a service provider offering the guidance service. The service provider can connect the user to a live agent. In some embodiments, the application executing on the client device may initiate the telephone call between a live agent and the user. In some embodiments, the user can place the telephone call directly to a live agent. The live agent can provide audio assistance to the user over the phone.

Figure 5:
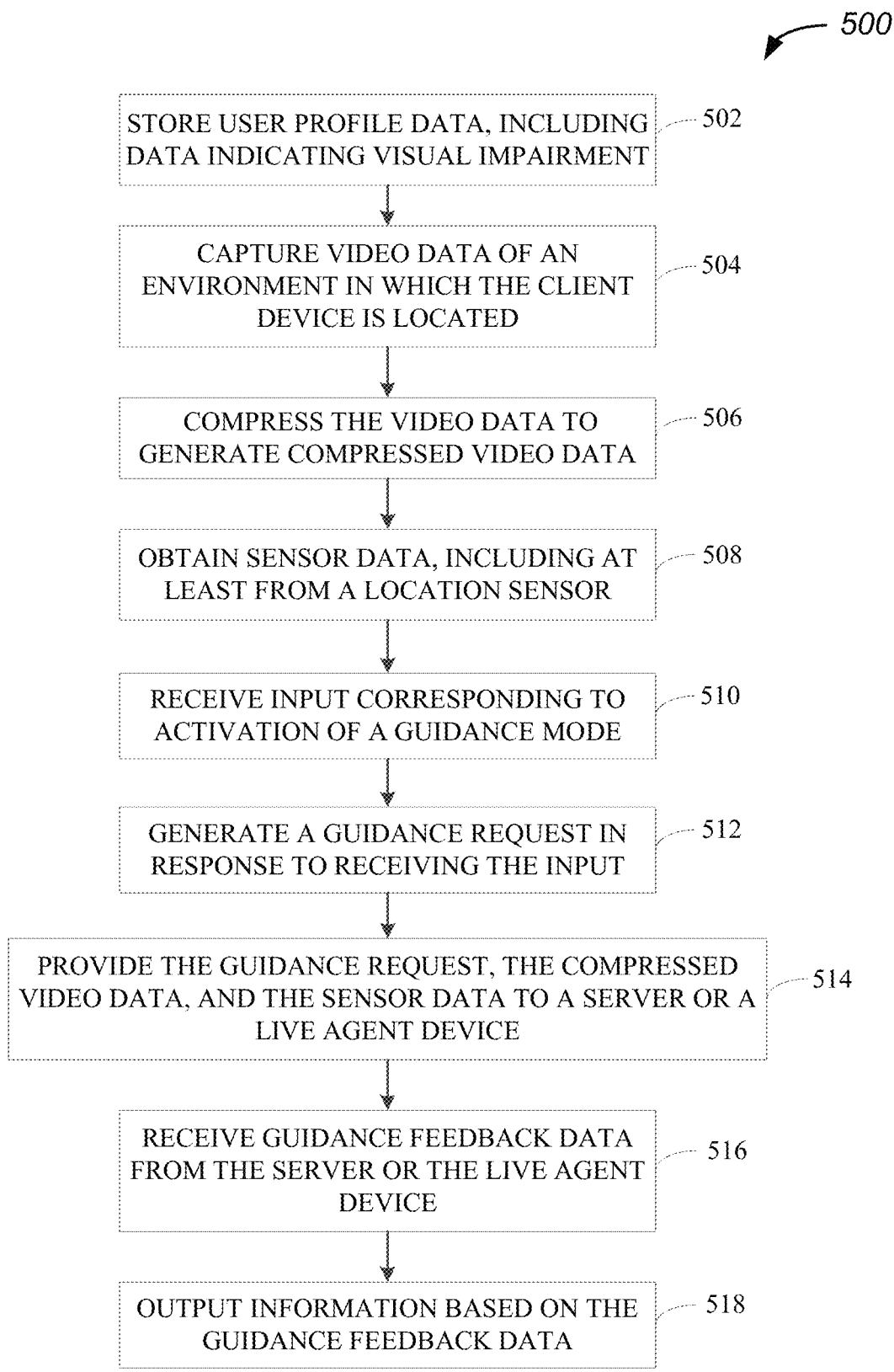
FIG. 5 is a flowchart illustrating a process performed by a client device, according to some embodiments.

FIG. 5 is a flowchart illustrating a process 500 performed by a client device, such as client device 220, according to some embodiments in which client device 220 can receive guidance assistance from a second device, such as server 230 or one of agent devices 240a-240c. Independent of requesting guidance, the client device may locally store user profile data for a user profile of a user of the client device (step 502). For example, the client device may store the profile data in a storage device of the client device (e.g., storage device 302).

At step 504, a video capture device (e.g., video capture device 346) may capture video data of an environment within the field of view of the video capture device. In various embodiments, the client device may be attached to or worn by the user (e.g., a wearable device, such as wearable eye glasses, or the like), or may be held very close to the person of the user. Hence, the captured video is representative of an environment in which the user is located. For examples in which the client device includes wearable eye glasses, the video may represent the scene from the perspective at which the user is viewing the environment.

At step 506, a video coding device (e.g., video coding device 344) may compress the captured video data. The video coding device may use one of a number of coding or compression techniques or algorithms to compress the captured video. Examples of video coding techniques may include moving picture experts group (MPEG), advanced video coding (AVC), high efficiency video coding (HEVC), or any other suitable coding technique. The size of the compressed video data is smaller than the size of the video data in the captured, uncompressed format.

At step 508, the client device obtains sensor data from one or more sensors of the client device (e.g., the one or more sensors 348), including at least sensor data from a location sensor. The sensor data may be obtained simultaneously or sequentially as the video is captured. The one or more sensors on client device capture the sensor data. The sensors may comprise of at least one location sensor that collects location or position information of the client device. As explained with respect to FIG. 3, one or more other sensors present on device may also collect a variety of sensor data. Examples of other sensors present on the client device may include at least one or more of a gyroscope, an oscilloscope, a magnetometer, an accelerometer, an ambient light sensor, a thermometer, a proximity sensor, or the like. The sensor data may include location information, orientation information, an acceleration and/or velocity of user, direction of travel, or other suitable sensor data.

At step 510, the client device may receive input corresponding to activation of a guidance mode. In response, the client device may activate the guidance mode. The input may include, for example, an input provided by the user by means of a touch, gesture, or verbal command, as described with respect to FIG. 3 and FIG. 4. In order to save battery power in some embodiments, video capture device 346 on client device 220 may be kept off until device 220 receives a request for guidance or otherwise receives an input to turn video capture device 346 on. Similarly, various ones of sensors 348, including the location sensor, can also be kept off until device 220 receives a request for guidance or otherwise receives an input to turn the sensors on. In some embodiments, input controls or options are provided to selectively turn certain sensors on or off in order to save battery power.

In some examples, a visually impaired user may cause the guidance mode to be activated by the client device when the user decides that assistance is desired or needed. For example, the user may want assistance to perform a particular activity, such as walking from a first location to a second location, reading a document or other writing, or any other activity. As another example, the user may want assistance in determining certain information, such as finding an object located in the user's surrounding environment, identifying a person located in proximity to the user, locating any obstacles that the user may encounter, or any other information that the user is unable to determine due to an impairment or limitation. Other examples of situations where a user may require assistance include: identifying luggage in an airport ("where is my suitcase marked with a green bungee?"), identifying public transport ("is that my bus?"), online identification as a human ("what does the captcha say?"), description of objects ("what does this shirt look like?"), recognition of emotions of people ("are they smiling?"), locating objects ("where are the oatmeal raisin cookies?"), locating areas ("where is the nearest men's room in this building?"), description of roads and intersections ("what does this intersection look like?"), participating in activities or social help ("where does the line start?" or "is she wearing a ring?" or "are there any open seats?" or "is the trail clear ahead?"), online assistance ("which emails are junk mail?"), help at a restaurant ("what is on the menu that I like?" or "what is in the classic cob?" or "how do I get to the door of the restaurant" or "where is the dining table?"), technical help ("how do I use this thermostat?" or "can I switch the TV channel to play my favorite show?" or "how can I turn on the descriptive video feature?"), reading documents such as letters, bills, bank-statements, medical reports, pill bottles, business cards, and the like, help with social media such as posting to FACEBOOK™, TWITTER™, or INSTAGRAM™.

In some embodiments, the guidance mode input may be independent of the user, and may come from a different person (e.g., an agent, a guardian of the user, or the like) or a different device (e.g., an agent device, the server 230, or other device). In some embodiments, an application executed by the client device for facilitating remote assistance services may automatically generate the input. For example, the application may detect that assistance is needed, and may generate the input.

At step 512, the client device may generate a guidance request in response to the input to activate the guidance mode. The guidance request may be in a form that is recognizable by a server, such as server 230, and by an agent device, such as agent device 240a, 240b, 240c. For example, the guidance request may include a command that the server 230 or agent device 240a, 240b, 240c can recognize as a guidance request. At step 514, the client device may provide the generated guidance request, the compressed video data, and the collected sensor data to the server or to the live agent device. The compressed video data and the sensor data may or may not be sent simultaneously to the server or the agent device. In some embodiments, the video data may be provided continuously as the video data is captured. For example, the client device may stream the compressed video data as a live video stream to at least one or more of the server or the live agent device as the video data is captured by the video capture device and compressed by the video coding device. In some embodiments, the sensor data may be provided periodically at an interval of time, such as every 30 seconds, every minute, every two minutes, or any other suitable time interval. In some embodiments, the request for guidance may be provided once each time contact with the server 230 or an agent is desired. In some embodiments, the request for guidance may be sent periodically.

At step 516, client device may receive guidance feedback data from the server or the live agent device. For example, an artificial intelligence program executed by the server 230 may provide guidance feedback data to assist the user. In another example, a live agent 250a, 250b, or 250c may provide guidance feedback data using the agent device 240a, 240b, or 240c to assist the user. Further details regarding guidance feedback data provided by the server or the agent device and the agent will be explained below.

At step 518, the client device may output information based on the received guidance feedback data to the user. The output information conveys the guidance feedback data to the user, and may be provided in various formats. For example, the information may be output as audio through a speaker (e.g., speaker 350) or through headphones connected to the client device. In some embodiments, the information may be provided as a haptic output, such as one or more vibrations or a braille enabled output. The user may then perform the activity or act on the information based on the guidance. For example, the guidance feedback information may instruct the user how the get from a first location to a second location, such as by providing step by step navigation instructions. As another example, the guidance feedback information may describe a document to the user and/or may read the document verbatim to the user.

In some embodiments, the client device 220 may operate in different modes. For example, the client device 220 may implement a privacy mode in which the video capture device is disabled from capturing video. Other functionalities of the client device 220 may also be disabled during the privacy mode. The privacy mode may be triggered in response to input for the user or in response to occurrence of an event. The privacy mode of the client device 220 is explained in more detail below.

In another example, the client device 220 may implement a local mode. In the local mode, the guidance request, the compressed video data, and the sensor data are analyzed locally by the client device 220. For example, the local mode may be implemented when an active network connection to a server or a live agent is not available. While in the local mode, the client device 220 may provide one or more guidance feedback instructions to the user based on local analysis of the guidance request, compressed video data, and/or the sensor data. The local mode may be activated in response to various conditions. In some embodiments, the client device 220 may detect a network condition that triggers the local mode. For example, the client device 220 may detect that a network connection to the server or the live agent has been disconnected or has fallen below a signal strength threshold (e.g., under a certain data rate required to transmit and receive the appropriate data, such as 500 kbps, 250 kbps, or 50 kbps, or any other determined data rate). When such a network condition is detected, the client device 220 may enter the local mode. While in the local mode, captured video data may be stored locally on the client device 220, either temporarily (e.g., until the network condition no longer exists) or permanently. In instances in which the video data is permanently stored, the user may cause the video data to be deleted. In some embodiments, the client device 220 may enter the local mode in response to the processor 304 detecting a battery level of the client device 220 as being below a threshold battery level, such as a percentage of a full battery level (e.g., 70%, 60%, 50%, 40%, 30%, 20%, 10%, or any other suitable percentage). For example, the processor 304 may detect that the battery level is below the threshold level, and in response may cause the client device 220 to enter the local mode. In some embodiments, the threshold battery level may be set by the user 210 of the client device 220. In some embodiments, the client device 220 may enter the local mode upon receiving an input corresponding to activation of the local mode. Such an input may be received, for example, based on user input provided using an input device of the client device 220. In other situations, such an input may be, for example, from a server.

FIG. 6 is an example of a user profile table 600 including information that can be stored in a user profile, according to some embodiments. In some embodiments, user profiles can be stored in a storage device at a client device (e.g., storage device 302). In some embodiments, user profiles may be stored in a cloud, and can be accessible by any authorized program or device. As illustrated in FIG. 6, the user profile table 600 can include various fields of information that relate to a user subscribed to a remote assistance service. Some fields may relate to personal and demographic characteristics of the user, such as a picture, name, gender, age, languages spoken by the user, contact information, places visited, emergency contact information, privacy information, impairment details related to the user, preference information, equipment or hardware used by the user, or any other suitable personal or demographic characteristics.

In some embodiments, personal and demographic information can be input by a user through an input device of a client device (e.g., client device 220). For example, a user can speak such information into a microphone of the client device upon being prompted (e.g., at step 406 or 410 of process 400). In some embodiments, personal and demographic information can be retrieved from one or more social media accounts of the user. Such information can be publicly available on a website of the World Wide Web or on the Internet. In some embodiments, such information can be privately held in a user account associated with client device 220 or privately held on a social media website and authorized for use in table 600 by explicit permission provided by the user. For example, the user can provide login information to social media websites from which such information may be retrieved.

Table 600 can also include contact information of the user, and one or more emergency contacts. Emergency contact information can be used, for instance, when a user loses connection with a server or a live agent during a guidance mode. The emergency contact information can also be used when the user requires medical assistance. In some embodiments, the user's home address may not be made available to an assisting agent by default.

As shown in FIG. 6, table 600 can also include a field to record the last place visited. The last place visited can be automatically updated, for example, after every guidance session, based on location sensor data. The last place visited can also be updated periodically when the client device, and more specifically a sensor in the client device, is turned on. In some examples, the last place visited is not editable by the user.

The user profile can also include information about a user's privacy preferences. For example, a privacy preference can include whether any video data provided by the client device of the user may be recorded, maintained, or accessed by one or more private parties, such as the server 230 and/or an agent device 240a, 240b, 240c and the corresponding agent 250a, 250b, 250c. In another example, a privacy preference can also include whether the audio portion of a guidance session can be recorded by the one or more private parties. In some embodiments, if a user does not consent to a copy of the video data or audio data from the client device to be stored and accessed, control objects on an agent interface (described below) can be made unavailable for selection by an agent. Agent interfaces and control objects in agent interfaces will be explained in further detail below.

The user profile table 600 can also include one or more fields with impairment details describing a visual or other impairment or limitation of the user. The impairment information can be stored in a free text format and describe a nature of the impairment, a cause of impairment, a length of time that the user has had the impairment, and any corrective equipment that is being used by the user, or other impairment information. In some embodiments, the impairment information may be selected from a list of available impairments. For example, an impairment may be selected by the user, or may be selected based on information provided by the user (e.g., information describing symptoms of the impairment). In some examples, a visual impairment of a user and/or a cause of the visual impairment can be selected from a list comprising: head injury, glaucoma, retinal detachment, hypertensive retinotherapy, cataract, age-related macular degeneration, diabetic retinopathy, retinal vascular occlusion, stroke overview, optic neuritis, chlorine poisoning, strabismus, intracranial hemorrhage, vertebrobasilar circulatory disorder, subarachnoid hemorrhage, brain aneurysm, Tay-Sachs disease, chemical poisoning, basal cell nevus syndrome, Ito syndrome, and stargards. The impairment details may be made available to a live agent during a guidance mode though an agent interface. The agent can have access to this information and thus be able to consider the exact nature of a user's impairment while providing assistance to the user.

The user profile table 600 can also include various user preferences. For example, the user preferences can include general preferences (described below), type of aid(s) currently used, familiarity with technology (e.g., on a scale from not familiar to highly familiar), experience with specific user hardware, daily usage pattern, a main purpose in using the remote assistance service, the user's walking speed, mobility expertise, level of detail desired by user (low, medium, high, highest), typical hurdles encountered by the user, and vulnerabilities.

General preference data can include any preference that the user may wish to have recorded in the profile. For example, a user may specify his or her food preferences, exercise preferences (e.g., walking, running, sports, or the like), route preferences, entertainment preferences, or other general preferences that can help when assisting the user. In one example of a food preference, a user can specify a preference for vegetarian food. In an embodiment, during a guided mode operation of the client device in which the user interacts with a live agent, the agent may notice from a video feed of the user's environment (provided from the client device to an agent device of the agent) displayed in an agent interface that the user is walking by a vegetarian restaurant. The agent can indicate to the user that a restaurant matching a food preference of the user is in proximity to the user. In an example of using route preferences, during a guided mode navigation operation in which an agent is providing the user with navigation guidance, the agent may determine from the user's profile that the user prefers to avoid roads with major intersections. The agent can view a map in the agent interface that indicates the user's location and the area in which the user is located. The agent can choose to navigate the user through smaller back roads that the agent can see on the map.

Table 600 can also include various details regarding any equipment that the user uses. This equipment information can include, for example, information about one or more client devices used by the user when accessing the remote assistance service. For example, the equipment information can include a make and model of a client device, such as a make and model of a phone or wearable glasses used when accessing the remote assistance service. In another example, the equipment information can include availability of hardware or functionalities of the client device, such as headphone availability, Bluetooth™ availability, or other hardware or functionality. In some examples, equipment information can also include the name of a network service provider that the user subscribes to for network access, data plan availability and allowance rate, or other information concerning the user's network plan.

In some embodiments, an agent or server with access to equipment information can utilize such information advantageously during a guidance mode operation. For example, a user may subscribe to a particular data plan and/or allowance rate to use client device 220 within the context of the system of FIG. 2. Depending on the data plan and allowance rate that the user is subscribed to, the client device may choose a quality of video data that is sent to the remote assistance server or the agent. If the allowance rate indicates that a maximum allowed data usage for the user is capped at a value below a data usage threshold (e.g., 100 MB, 500 MB, 2 GB, 5 GB, or other suitable data usage threshold) or any other suitable data usage threshold), the client device can choose to stream low quality video to the remote assistance server or agent. On the other hand, if the maximum allowed data usage is higher that the data usage threshold or is unlimited, the client device may choose to stream high quality video. In some cases, the client device may automatically adjust the video quality based on the data plan and allowance rate. In another example, the allowance rate may be used by the client device, an agent, or a remote assistance server (e.g., server 230) to determine to cause the client device to operate in the local mode.

In some embodiments, the availability of hardware, such as personal accessories (e.g., wired or wireless headphones) can be considered by an agent during the guided mode. For example, the agent may recognize that a user does not have headphones, and thus surmise that the user is listening to audio guidance feedback using speakers on the client device. In such situations, the agent may not bring up personal or sensitive information during the conversation if the agent feels people may overhear the conversation.

Figure 7:
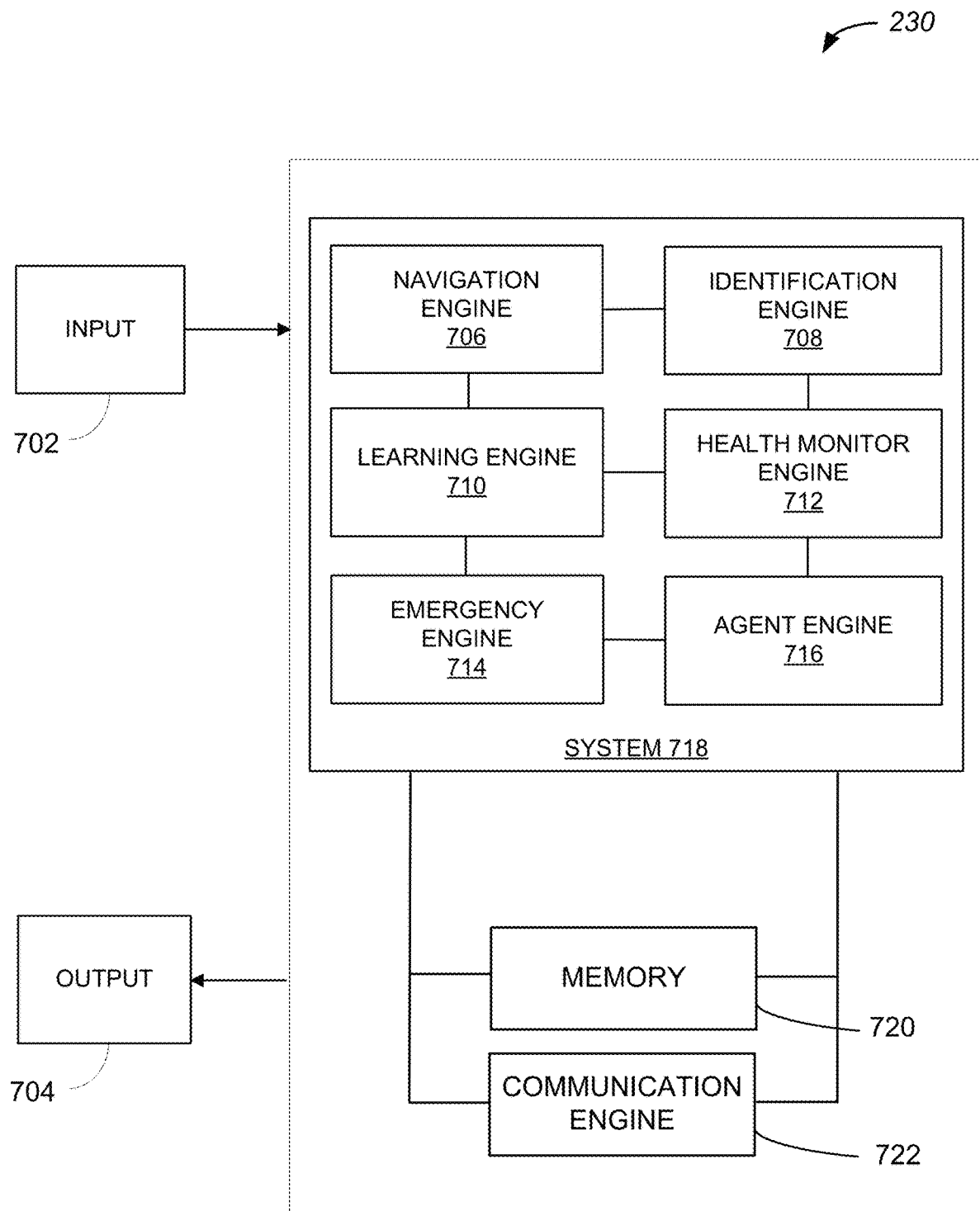
FIG. 7 is a block diagram illustrating components of an example server, according to embodiments.

As described above, the client device 220 can send data (e.g., guidance requests, video data, sensor data, or the like) to a remote assistance server 230. FIG. 7 is a simplified block diagram illustrating components of an example remote assistance server 230, according to embodiments. The server 230 can be maintained by a provider of the remote assistance service. In some embodiments, the server 230 can include a single server device or multiple server devices. In some embodiments, the server 230 can be connected to the client device 220 through the network 260. In some embodiments, the system forming 230 can be implemented in the same hardware as an agent device (e.g., agent device 240a, 240b, and/or 240c), or a combination of several devices. Although server 230 will be explained below for embodiments where server 230 is physically separated from an agent device, one of ordinary skill in the art will appreciate that such an implementation is not the only possible implementation.

The server 230 can include an input device 702 that receives input from various sources, such as, for example, from a client device 220 or other client device subscribed to the remote assistance service, or from an agent device, such as agent devices 240a, 240b, or 240c. The server 230 can further include an output device 704. The output device 704 can send information to various destinations, such as, for example, to a client device 220 or other client device subscribed to the remote assistance service, or to an agent device, such as agent devices 240a, 240b, or 240c. As mentioned previously, the network over which the server 230 can communicate with a client device (e.g., client device 220) or an agent device (e.g., agent device 240a, 240b, 240c) can be over a wired or wireless network, such as a wireless LAN or WAN.

The server 230 also includes an artificial intelligence (AI) system 718. The AI system 718 can include multiple components that provide the server 230 with artificial intelligence that can remotely assist a visually impaired (or otherwise impaired or limited) person using a client device, such as client device 220 described above. In some embodiments, with the aid of the AI system 718, the server 230 can partially or wholly allow the client device 220 to operate in a guidance mode. In the example shown in FIG. 7, the AI system 718 includes a navigation engine 706, an identification engine 708, a learning engine 710, a health monitor engine 712, an emergency engine 714, and an agent engine 716 where the various engines can be software modules or other program code that enable server 230 to carry out specific functions. One of ordinary skill in the art will appreciate that the list of engines shown in FIG. 7 is only one non-limiting example. In some examples, one or more of the engines shown in FIG. 7 may be omitted from the AI system 718. For example, some embodiments may comprise AI system 718 with none or some or all of engines shown. In some examples, other engines other than those shown in FIG. 7 may be present in the AI system 718. Each of the engines depicted in FIG. 7 can be implemented as separate software modules dedicated to the functions described with respect to the particular engine or some or all of the engines may be part of a module or software application that performs the functions of multiple ones of the engines. In some embodiments, a processor or a plurality of processors may be configured to form at least one or more of the engines, and in some embodiments one or more single engines may be carried out by multiple processors.

In some embodiments, navigation engine 706 can be configured to provide navigation data in the form of guidance feedback data to a client device, such as client device 220. The navigation data can be provided to the client device based on at least location data received from the client device. For example, the input device 702 of the server 230 may receive the location data from the client device 220. In one example, the navigation engine 706 can provide navigation instructions from a starting point A to a destination point B. Navigation data from the navigation engine 706 can be specially suited for the purposes of guiding an impaired person, such as a visually impaired person or a person with other impairments or limitations that lead that person to needing navigation assistance. For example, the navigation engine 706 can receive location sensor data from client device 220, such as data from a global positioning system (GPS) sensor, a triangulation or trilateration sensor, compass data and other location-related sensor data that can be used to provide navigation and guidance assistance to the user. The navigation engine 706 may provide functionality beyond existing navigation systems that are based on GPS or other location technologies. For example, apart from providing a tailored estimated time of arrival (ETA) based on a specific user's impairment, navigation engine 706 can help identify hazards along a path (e.g., uneven or angled surfaces, obstructions due to construction work, or other hazards the user may encounter while navigating to a destination point). In another example, the navigation engine 706 can identify points of interest near the user, such as in accordance with preferences of the user (e.g., as identified from the user's profile). In another example, the navigation engine 706 can identify the location of the user relative to certain structures or objects, such as a structure or object that may be obvious to a user without the user's impairment, but not obvious for a user with the impairment. For example, the navigation engine 706 can provide audible feedback to the user indicating that the "Empire State building is on your left and the entrance is located 20 degrees to your right, approximately 10 feet away."

The navigation engine 706 can take over where typical GPS navigation systems stop. For example, the navigation engine 706 can provide guidance feedback to a client device (e.g., client device 220) of an impaired or limited user with Orientation and Mobility (O & M) details and an explanation of a user's environment that are not provided in available navigation system. Such O & M and explanation details can include information that may not need to be pointed out to people without the particular impairment, such as people that do not have a vision impairment or other impairment or limitation. O & M data can utilize a user's available sensory information to identify various features during a guided mode operation. Sensory information can include the presence of sights, sounds, and smells, changes in the walking surface, such as upward or downward slopes, the presence or absence of wind, or other sensory information related to the user's environment. The sun can be used to identify where the user is in relationship to buildings and other locations or objects along a route. Other sensory information can include texture changes, such as a change of a walking surface from cement to blacktop, rug to floor, and brick to cement. In some examples, the navigation engine 706 can identify stairs, revolving doors, multiple lanes on a road, or other details.

O & M data can refer to data that a blind person or otherwise impaired or limited person would require in the course of navigation, but data that a person without impairment may not need. For example, the navigation engine 706 can provide guidance feedback to a client device of a visually impaired user identifying a door as a revolving door as opposed to a door that opens and shuts. This type of O & M data can be important for a visually impaired person to properly enter or exit through the door. As other non-limiting examples, the navigation engine 706 may provide guidance feedback to the client device of the visually impaired user identifying the presence of stairs, a steep slope, a one way street, an intersection with diagonal crossing, a construction zone, or other O & M data that helps the user identify objects or other items in their environment as they navigate.

In some embodiments, the navigation engine 706 can provide guidance feedback data with O & M data using specific vernacular in describing environments to make it easier for visually impaired persons to understand. In some examples, the navigation engine 706 can comprise a database of O & M data typically required for a list of navigation situations. For example, one such situation could be the crossing of a street. The O & M data used for such a situation can include guidance feedback data indicating whether the walk sign is on, guidance feedback data indicating whether diagonal crossing is allowed, guidance feedback data indicating whether there are automobiles making a turn (e.g., a right turn on a red light) thereby putting crossers in danger, or other O & M data. A live agent navigating a blind person (e.g., a live agent that has not been trained in O & M data) may easily miss providing such important O & M details about the environment. The O & M data can be made available to an agent in an agent interface. An example of an agent interface will be explained below with reference to FIG. 12.

Navigation engine 706 can also have access to other data sources, such as building floor plans, bus schedules, and train schedules. Such access can be provided to the server 230 from one or more of the external services 290. Data from external services 290 can provide information that supplements the navigation engine 706 in providing guidance feedback request. For example, the navigation engine 706 can receive bus schedule information from a server that maintains information about a bus service. Using the bus schedule information, the navigation engine 706 can provide the client device 220, and eventually user 210, information on how long the user can expect to wait at a bus stop.

In some embodiments, the navigation engine 706 can employ a crowd sourcing feature to learn O & M data. Such a feature may be implemented at server 230 which may handle multiple sessions, both with the same client device, and with several client devices. Indeed, navigation engine 706 can communicate with several client devices at the same time or within a short period of time. In such situations, according to embodiments, navigation engine 706 can gather O & M data from several users. The navigation engine 706 can maintain a common pool of such knowledge and provide various users with guidance feedback data with crowd-sourced O & M information. Navigation engine 706 can work in conjunction with learning engine 710 to apply machine learning to crowd-sourced data. Such information may also be made available to O & M training experts.

In some examples, where privacy settings of a user allows, an image snapshot of an environment can be captured by the client device, sent to the server 230, and stored by the server 230 in a crowd-sourced database. For example, an image of the entrance to a building can be stored in the crowd-sourced database. Similar snapshots of stairs, elevators, and other O & M data can be maintained at the server 230. Similarly, locations of points of interest such as restrooms in a building, the lobby of a building, the reception area of a building, or other O & M data can also be maintained in the crowd-sourced database. These snapshots and locations can be used by the server 230 when providing AI guidance feedback, or can be made available by the server 230 to a live agent while navigating a different user. One example of such a scenario will be provided later in conjunction with the agent interface and explained with reference to FIG. 16.

Identification engine 708 can identify one or more objects based visible to the user of client device 220 from video data captured by and received from the client device 220. An example of a function of an identification engine 708 may be to identify empty seats in public transport, such as a bus, a train, or other public transport. For example, the identification engine 708 may perform face recognition methods to identify empty seats on a bus. Once the identification engine 708 has identified an empty seat, the server 230 (e.g., the navigation engine 706) may provide guidance feedback data to the client device (e.g., client device 220) that navigates the user to the empty seat.

Identification engine 708 can analyze a video data feed received from the client device 220 to recognize various features using several techniques. For example, objects such as doors (e.g., revolving doors, automatic doors, or the like), stairways, furniture (e.g., tables, chairs, bookshelves, or the like), transportation information (e.g., bus numbers, bus or train schedules as identified from video image(s) of a sign at a bus or train station), and/or other information can be intelligently recognized using image or pattern recognition. In some embodiments, identification engine 708 can also be configured to detect features or objects from video of an environment. For example, as described above, the identification engine 708 can detect unoccupied seats in public transport, or may identify people from facial characteristics using facial recognition techniques.

For example, algorithms based on convolutional neural networks can be applied to video data feed received from the client device. A determination can be made as to whether the video data feed contains a specific feature, object, or activity. Such features, objects, or activities can be specified to the algorithm as predefined input. In other aspects, features, objects, and activities may be learned.

In some examples, the identification engine 708 can have access to databases, such as FACEBOOK, LINKEDIN, TWITTER, UBER, YELP, AMAZON, NEXTBUS, BLINDSQUARE, or other database, through an integration engine (not shown in FIG. 7). In some embodiments, access to profiles of several people may be available through a login provided by a user of the client device. When identification engine 708 identifies people from video of an environment, the identification engine 708 may access their social network profile (e.g., if the user of the client device has access to the peoples' profile(s)). In embodiments, the profile information may be provided to the user of the client device while the identified people are still in the user's surroundings. In embodiments, the profile information can be provided to agent devices of agents (e.g., agent devices 240*a*, 240*b*, or 240*c*). The agent(s) can then use the profile information while providing guidance feedback to the user.

The learning engine 710 can include machine learning capabilities. The learning engine 710 can use machine learning, for example, to identify patterns of usage of a user. The learning engine 710 may be an adaptive system that learns patterns, habits, preferences, quirks, and routines of users. This may make a guidance mode operation more enjoyable and convenient for a user. For example, on a street with sidewalks on both sides, the learning engine can learn that a user prefers to use one side as opposed to the other. The learning engine can communicate the user preference to navigation engine 706 during a guidance mode operation. The learning engine 710 can also be integrated into other machine learning commercial services, such as CLARIFAI, MICROSOFT PROJECT OXFORD, MIT PLACES, or the like.

In embodiments, the learning engine 710 can learn a user's route to work, the time each day that the user commutes to work, or other routine of the user. The learning engine 710 can maintain information regarding all steps a user needs to take for this commute and the reverse commute. The learning engine 710 can additionally retain a list of past routes used and places frequently visited by the user.

The learning engine 710 can also learn habits and quirks of a user. For example, a user may stop at a deli or coffee shop on the way to work on several days. The learning engine 710 can deduce that a correlation exists between the time of departure for work and whether the user stops at the coffee shop—the user may not stop at the coffee shop if he or she leaves after a certain time. Based on such deductions, the learning engine 710 can communicate with the navigation engine 706 to provide input on whether the navigation engine 706 should suggest any detours or modify guidance feedback in any way.

As shown in FIG. 7, the server 230 can further include an emergency engine 714. The emergency engine 714 can be configured to determine an emergency event. The emergency engine 714 can provide guidance feedback data that assists to the user when an emergency event is detected. In one example, the emergency engine 714 can determine an escape route calculation in the event of an emergency or disaster. In another example, the emergency engine 714 can send input identifying the emergency or disaster to the navigation engine 706, and the navigation engine 706 may determine the escape route. The emergency engine 714 and/or the navigation engine 706 can send guidance feedback data with the escape route to the client device (e.g., client device 220). The emergency engine 714 may be configured to detect emergency situations in which a user may be involved. In embodiments, sensor data may be used by the emergency engine 714 intelligently to deduce an emergency. For example, data from a sensor located in the client device 220 (e.g., an accelerometer, gyroscope, or other sensor) can be provided to the server 230, and used by the emergency engine 714 to detect a user fall or impact in an accident. In some embodiments, the emergency engine 714 may work in conjunction with a health monitor engine 712, which will be described in greater detail below, to infer medical emergencies of a user.

In some embodiments, server 230 can further comprise an agent engine 716. One function of agent engine 716 may be to transfer control between the server 230 and one or more live agent devices, such as agent devices 240a, 240b, 240c used by agents 250a, 250b, and 250c. Agent engine 716 can be configured to identify situations where the AI system 718 of the server 230 may be insufficient to provide optimal guidance feedback to a client device and the user of the client device. Upon identification of such a situation, agent engine 716 can pass guidance control to a live agent device. In some embodiments, the user can indicate that he or she wishes to be connected to a live agent, or may request or accept an auto mode while connected to an agent. The auto mode will be explained further below. For example, the user can provide input to a client device 230 that sends a signal to the server 230 indicating the user wants to be connected to the live agent. Engine 716 can respond by sending a signal to a live agent device that causes the guidance control to be transferred to that live agent device. One example of a process involving the agent engine 716 will be provided in connection with FIG. 10.

In some embodiments, the agent engine 716 may coordinate transfer of data (e.g., video data, sensor data, or other suitable data) from the client device to the agent device such that, to agents interacting with the agent device the user's events are synchronized. The agent engine 716 can also manage transfer of the guidance control and/or the data from one agent device to another agent device based on availability and other criteria. For example, a guidance mode operation might still be underway when an agent's shift ends. Agent engine 716 can ensure that a certain minimum period of overlap between the two agents is available where the incoming agent can listen in or observe the guidance mode operation of the outgoing agent to understand the situation. In this way, the agent engine can facilitate smooth hand-off of sessions between agents.

Agent engine 716 may work with learning engine 710 to identify agents that match well with specific users or situations. For example, a fully blind user might require a more experienced agent, when compared to a visually impaired user that has at least partial vision. The agent engine 716 can transfer guidance control to an agent that matches well with a given user or situation. In some embodiments, agent engine 716 can select an appropriate agent for a user or situation based on the a user profile, based on a profile of the agent, and/or based on the type of guidance required. For example, some agents may be experienced with certain kinds of users or trained to handle certain kinds of impairments or services. When available, the agent engine 716 can select the best match for a user.

In some embodiments, the server 230 can include a health monitor engine 712. The health monitor engine 712 can be configured to process health, fitness, or other health data that may be sent by the client device or an attachment to the client device (e.g., a FITBIT™, a mobile phone, or other device connected to the client device). Using the health data, the health engine 712 may monitor and track user health. Non-intrusive or minimally intrusive measurements indicating a user's health can be made by the client device 220 or an accessory attached to the client device. Examples of measurements include a user's body temperature, heart rate, blood sugar level, and the like. Based on the measurements, health monitor engine 712 may continually monitor a user's health.

Although not shown in FIG. 7, in some embodiments, the server 230 can also include an integration engine that can help server 230 communicate with external services, such as the external services 290 shown in FIG. 2. Such external services can include transportation services (e.g., taxi cab services, UBER™, LYFT™, or other transportation services), schedules such as train and bus schedules, menus from restaurants and cafes, review services from websites such as YELP, shopping services, or any other suitable external service, such as NEXTBUS, BLIND SQUARE and the like. In some embodiments, a visually impaired user can use remote assistance from the server 230 or an agent in shopping at a website such as AMAZON.COM.

In some aspects, the server 230 can also function as a headquarters for the remote assistance system 200. The server 230 can maintain logs of all agents, users, sessions, times, and requests. Such logs may be available for data analytics and review. Based on such data, various optimization methods and processes may be applied to the system 200.

Figure 8:
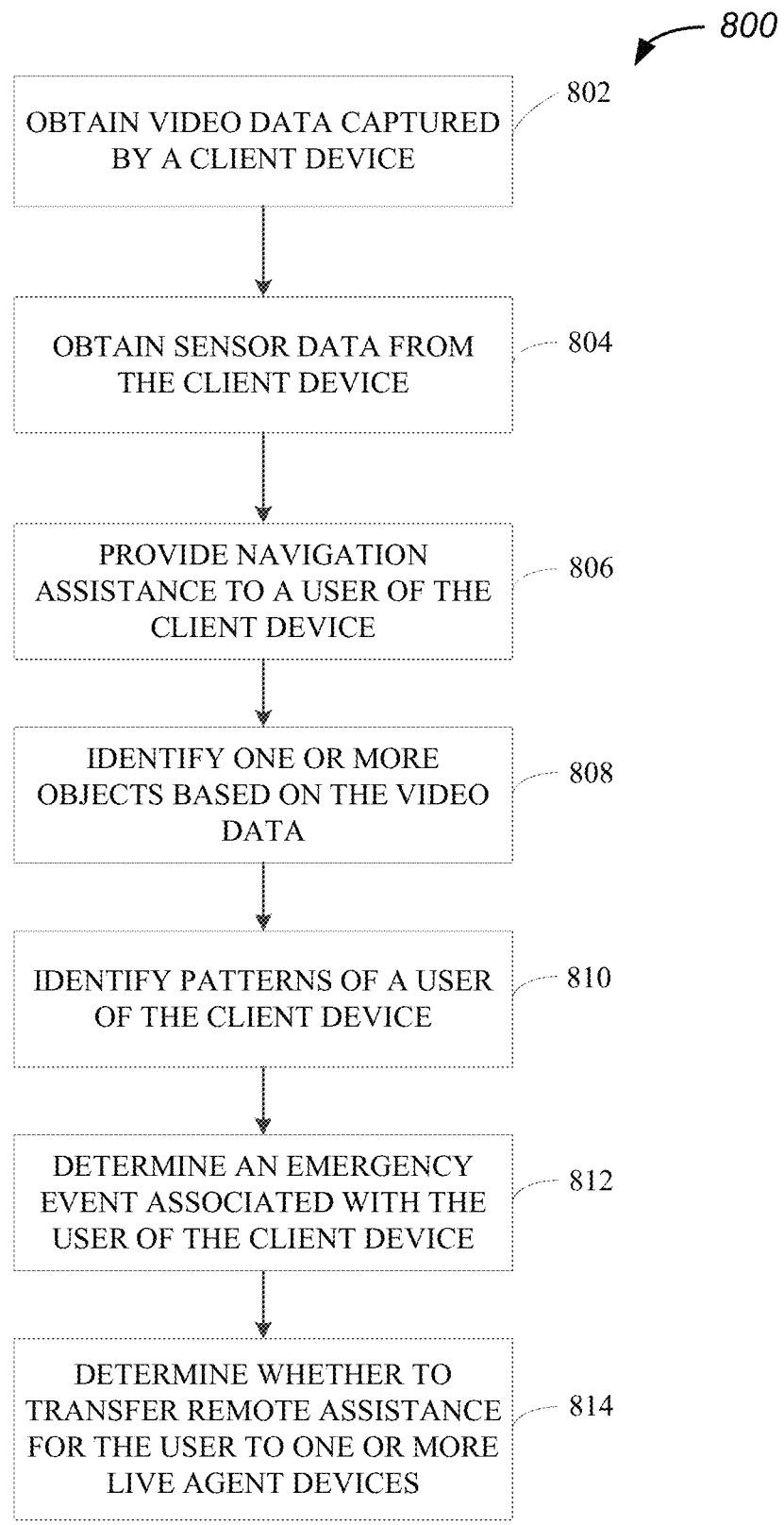
FIG. 8 is a flowchart illustrating a process performed by a server, according to embodiments.

FIG. 8 depicts a flowchart illustrating an example of a process 800 of facilitating remote assistance. The process 800 may be performed by a server, such as server 230, in some embodiments. Although flowchart 800 illustrates various operations as a sequential process, such operations can be performed in parallel, concurrently, or not performed in some embodiments. In addition, the order of the operations may be re-arranged and the process can have additional steps not included in FIG. 8. Additionally, the process of FIG. 8 can generally operate as an ongoing loop while the client device 220 is in guidance mode and requesting guidance from server 230.

The process 800 can occur when a client device (e.g., client device 220) communicates with a server (e.g., server 230) during a guidance mode of the server and the client device with a user. In one example, a visually impaired user 210 can activate a guidance mode using a client device while on a morning commute to work. Although methods and systems will be explained for this example of the user's morning commute, processes described in flowchart 800 should be understood as being of a more broad and general application to any scenario in which the user is in need of remote assistance.

At block 802, the process 800 includes obtaining video data captured by a client device. For example, the server 230 can obtain video data regarding the immediate surroundings of the client device 220 (and thus the user 210), as captured and sent by the video capture device 346 of the client device 220. At block 804, the process 800 includes obtaining sensor data from the client device. The sensor data may be obtained independently or simultaneously as the video data is obtained. For example, the server 230 can obtain sensor data captured by the one or more sensors 348 of the client device

220. The sensor data can location information that identifies the location of the client device 220, and hence the location of the user 210. The server 230 may know the user's destination from one or more of many sources. For example, the server 230 may have access to the user's profile, which may have information regarding the user's work address. As another example, the user may communicate his or her destination at the beginning of the guidance session using the client device 220. The sensor data can also include any of the sensor data described above with respect to FIG. 3, such as sensor data obtained using an altimeter, a gyroscope, a magnetic compass, an impact sensor, an accelerometer, an infra-red sensor, an ambient light sensor, a temperature sensor or thermometer, or any other suitable sensor. In some embodiments, server 230 can continuously receive video data and sensor data per steps 802 and 804 while the server is providing navigation assistance or other guidance to a client device 220 in accordance with step 806.

At block 806, the process 800 includes providing navigation assistance to a user of the client device. In one example, based on a guidance request from the client device 220, the server 230 can carry on navigation assistance to the user 210 using the navigation engine 706. During the navigation session, the server 230 may provide navigation instructions, O & M data, and other feedback that is tailored to user 210 and his or her visual impairment. As explained in detail below, the server 230 can also transfer control back and forth between the server 230 and one or more live agent devices and the corresponding agents operating the agent devices.

At block 808, the process 800 includes identifying one or more objects based on the video data. As one example, the server 230 may identify a friend of the user during the user's commute. The server 230 can use a facial recognition algorithm, for example, using artificial neural networks as mentioned previously, to identify a face of the friend. The server 230 can send data (e.g., an audio signal) to the client device 220 indicating that a friend is in the vicinity of the client device 220. The client device 220 can output the data (e.g., an audible output using speaker 350 or earphones) informing the user 210 that the friend is in the vicinity. The server 230 can also provide to the client device 220 the friend's profile from social media. In examples, the client device 220 may have the profile information stored locally, and may locally provide the profile of the friend. The user can then choose to greet the friend. In another example, at block 808, the server 230 can use the identification engine 708 to identify empty seats on a public transport system during the user's commute, as described above with respect to FIG. 7.

At block 810, the process 800 includes identifying patterns of a user of the client device. In one example, the server 230 can utilize its learning engine 710 to deduce that, based on a starting time of the user's commute, the user 210 may wish to stop at a coffee shop on the way to work. In response, the server 230 can send audio data that can be output by the client device 220 indicating that a coffee shop is in a particular location along the path of the user's commute. The learning engine 210 can more generally be used to identify several patterns and routines of the user, as described above with respect to FIG. 7.

At block 812, the process 800 can include determining an emergency event associated with the user of the client device. For example, the server 230 can utilize the emergency engine 714 and/or the health monitor engine 712 to identify an emergency event. In one example, during the user's commute, the server 230 can warn the user of a speeding car that has a good chance of running the red light and colliding with the user while the user is crossing the road. In another example, the emergency engine 714 can detect that a user has fallen while commuting.

At block 814, the process 800 can include determining whether to transfer remote assistance for the user to one or more live agent devices and the corresponding agents. For example, the server 230 can transfer control of the remote assistance to a live agent that uses a live agent device. In some embodiments, the server 230 may obtain control of the remote assistance back from the live agent device. As will be explained later with reference to FIG. 11, such transfer of control may be triggered by various events, including an explicit request from the user.

The guidance mode may end, for example, when the user 210 reaches his or her destination, or when the user 210 indicates through the client device 220 that assistance is no longer required.

Figure 9:
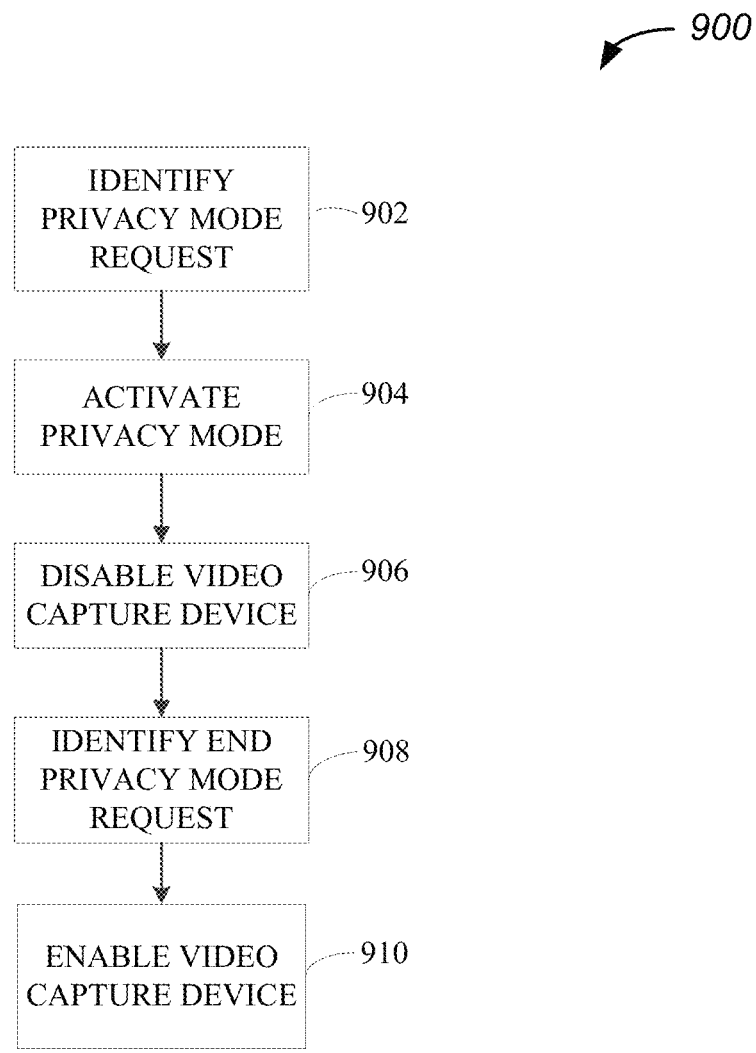
FIG. 9 is a flowchart illustrating a process of handling a privacy mode request, according to some embodiments.

FIG. 9 is a flowchart illustrating an example of a process 900 for processing a privacy mode request. The privacy mode operation can be implemented at the client device 220, the server 230, at a live agent device 240a, 240b, 240c, or at a combination of the devices and server 230. In some embodiments, the process 900 can be performed by a server 230 to facilitate a privacy mode of the client device 220. In some embodiments, the process 900 can be performed by the client device 220. Because embodiments may involve capture and transmission of a live video feed of an environment as captured by a video capture device of a client device worn or held by a user, such as client device 220, there could be privacy concerns for the user at various times when the user may not be comfortable with sending video data of his or her immediate surroundings. A privacy mode can be implemented to account for such situations.

At block 902, the process 900 includes identifying a privacy mode request. In embodiments, the privacy mode request can be identified at the client device 220. For example, a user 210 may indicate to the client device that he or she needs privacy. The user 210 may indicate the privacy request by pressing a button on the client device 220, using a voice command, using a gesture, or a combination. In embodiments, the privacy mode request can be identified at the server 230. For example, the user 210 can provide input indicating the privacy request by pressing a button on the client device 220, using a voice command, using a gesture, or a combination, and the client device 220 may send the request to the server 230. In another example, using the learning engine 710, the server 230 may deduce that privacy is needed based on certain conditions indicating a privacy event. For example, the server 230 can determine that at certain times of the day, such as when the user is expected to be using the locker room in the gym, the user may wish to activate privacy mode. In another example, the identification engine 708 of the server 230 may detect that a user is in a particular location (e.g., a bathroom, a bedroom, a changing room, or other private location) based on a received video feed, and may deduce that privacy is needed based on the location. In some embodiments, the need for a privacy mode can be identified and suggested by a live agent, and can use a live agent device to communicate the privacy request to the server 230, and then to the client device 220 or directly from the agent device to client device 220.

At block 904, the process 900 can include activating the privacy mode. In some embodiments, the client device 220 can activate the privacy mode based on the user's input indicating the privacy request. In some embodiments, the server 230 or a live agent (using a live agent device) can activate the privacy mode based on the deduced or detected privacy event. For example, the server 230 or live agent device can send a signal to the client device 220 that activates the privacy mode on the client device 220. At block 906, the process 900 includes disabling a video capture device. The video capture device can be deactivated once the privacy mode is activated. The privacy mode can be implemented at the client device 220. For example, the client device 220 may disable the video capture device 346, and may thereby stop sending a live video data feed, or sensor data, or both, to the server 230 and/or the live agent device.

At block 908, the process 900 can include identifying an end of privacy mode request. For example, a trigger to end the privacy mode can be detected by the client device 220, the server, or the agent device. The client device 220, the server 230, or the agent device may cause the video capture device or other sensors to be re-enabled, and video capture may resume at the client device 220.

In some examples of an implementation of process 900, a user can request a privacy mode when he or she wishes to use the restroom, or when the user is in a locker room. For example, the user can say the voice command "Privacy" or push an appropriate button on the client device to request the privacy mode. During such a request, the client device can disable the video capture device, mute the phone at the user's end if there is an ongoing phone call, and/or turn off some or all of the sensors. During the privacy mode, some sensors such as the ones required to detect an emergency may still be turned on. When the user is ready to turn off the privacy mode, he or she may trigger normal mode operation (e.g., by saying the voice command "Privacy Off" or pushing the button on the client device that turned on the privacy mode).

Several different privacy modes representing different levels of privacy, which can be programmable, can exist in a client device, at a server, or under a user profile. Each mode can selectively enable and disable video capture devices, audio capture devices, and sensors. For example, a blind user using a wearable client device, such as a pair of electronic glasses, may wish to activate a particular privacy mode during a visit to a physician. The particular privacy mode can cause the video capture device to be on (and the video feed provided to the server or agent device) while the user is wearing the pair of glasses on which the video capture device is mounted, but cause the audio capture device to be muted so that the server or agent device does not receive audio of the user or the physician. In such an example, a live agent may be able to view the physician treating the user and provide feedback, but may not be able to view the user or hear the conversation between the user and the physician.

Figure 10:
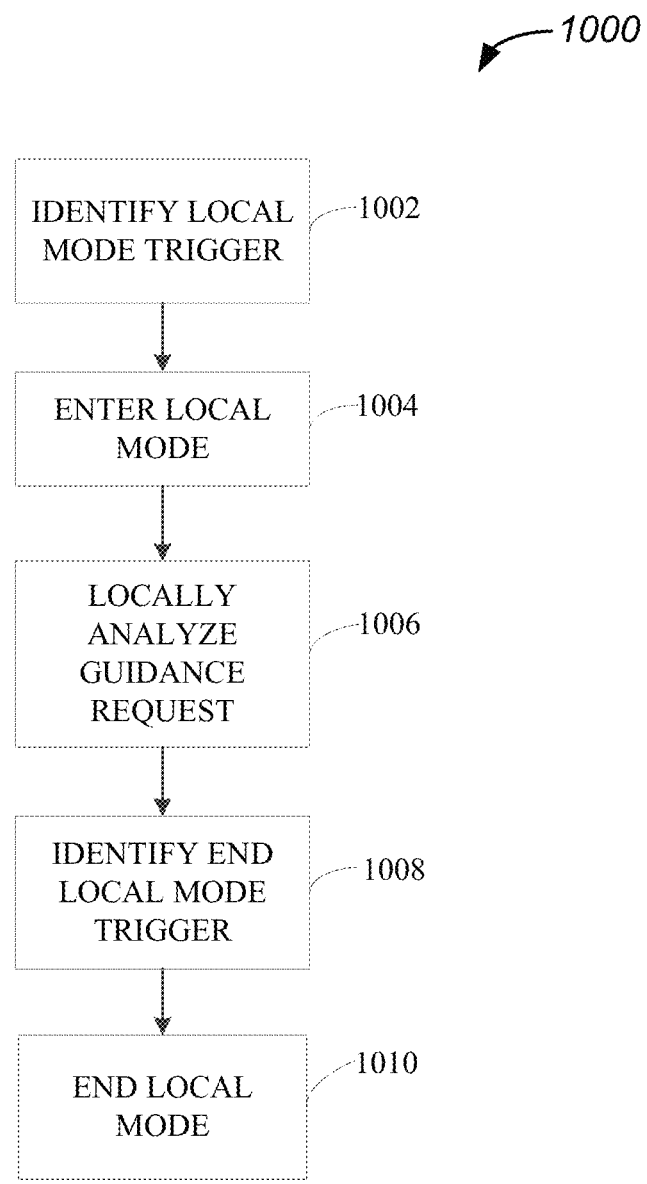
FIG. 10 is a flowchart illustrating a process of handling a local mode, according to embodiments.

FIG. 10 is a flowchart illustrating an example of a process 1000 for processing a local mode trigger. The local mode operation can be implemented at the client device 220, and may be facilitated by the server 230 or the client device 220. A local mode enables guidance from the client device 220 itself for a period of time. In a local mode operation, client device 220 can take certain actions automatically, without input from the server 230. The presence of a local mode may provide further confidence to a user 210 of the client device 220, who may feel comfortable that a backup assistance or guidance services exists if a network connection is lost.

At block 1002, the process 1000 can include identifying the initiation of a local mode trigger. A local mode can be initiated by the user 210 through the client device 220, or by the server 230, or at both the client device 220 and the server 230. In some examples, the user 210 can cause initiation of the local mode by selecting a button or icon on the client device 220. In some examples, a local mode operation can be triggered by low bandwidth conditions, such as network interruptions. For example, the client device 220 may detect that a network connection is below a certain signal strength (e.g., under 10 megabits/second, under 9 megabits/second, under 5 megabits/second, or any other suitable signal strength level). In some embodiments, the signal may be set by the user 210 or by the provider of the remote assistance service. For example, the provider may set a default signal strength level, and the user may be able to change the signal strength level. In some examples, a local mode operation can be triggered by a server failure, in which case a connection to the server may be lost. In some examples, a local mode operation may be triggered by a connection failure of the connection between the client device 220 and the server 230 and/or one or more agent devices 240a, 240b, 240c. In embodiments, a local mode may operate in conjunction with other modes, such as privacy mode or any other mode described herein.

At block 1004, the process 1000 can include entering local mode. In some embodiments when the local mode is operational, the client device 220 may have either minimal or no communication with the server 230. Similarly, in some embodiments, the client device 220 may have either minimal or no communication with any live agent devices during local mode. However, in some embodiments, the user 210 may still conduct, using the client device 220 while operating in the local mode, an ongoing telephone call with a live agent using an agent device. In some embodiments, during the operation of a local mode, a live agent device may be able to locate the position of the client device 220 independently of the existence of a network connection between the client device 220 and the server 230. The local mode can be implemented at the client device 220, with or without facilitation from the server 230, an agent device, or the agents of the agent devices.

At block 1006, the process 1000 includes locally analyzing guidance requests. Guidance requests can be analyzed locally by the client device 220 (e.g., by an application or program executing on processor 304) based on input from the user 210, in order to provide guidance feedback for the user 210. In embodiments, client device 220 can be configured with some of the same hardware explained with reference to server 230, thus making device 220 capable of performing some or all of the functions of server 230. For example, the client device 220 can have at least one or more of a navigation engine, an identification engine, a learning engine, a health monitor engine, an emergency engine, and/or an agent engine. Each of these engines can operate similarly as the engines described with respect to FIG. 7.

In some embodiments, local analysis of guidance requests may be performed at the client device 220 using certain information maintained locally for use during local mode operation. For example, when a network connection (e.g., an Internet, broadband, or other wide area network connection) is available to the client device 220, the client device 220 can store local maps, information about a neighborhood in which the client device 220 is located, information about public transport in the neighborhood, information about the user's location, or other suitable information. This information can relate to only an immediate neighborhood in which the client device is located. Further, the information can be refreshed when the client device moves more than a threshold distance (e.g., every 1 mile, every 2 miles, every 5 miles, or other appropriate distance), when a network connection is available. When a local mode operation is triggered, the client device can have locally stored information available for guidance in the immediate neighborhood or vicinity of the client device.

At block 1008, the process 1000 can include identifying a trigger to end the local mode operation. The trigger to end local mode operation can be detected either at the client device 220, or at the server 230, or both. In some examples, the user 210 can initiate an end to the local mode operation by selecting a button or icon on the client device 220. In some examples, the local mode operation can be terminated when a low bandwidth condition is no longer present. For example, the client device 220 may detect that a network connection has gone above the signal strength level described above. In some examples, the local mode operation can be terminated upon detection that a server failure or connection failure has been resolved, and that the connection to the server or an agent device has been restored. For example, a trigger to end local mode operation may be that a network connection becomes available after a period of interrupting. In some embodiments, upon a server identifying a trigger indicating termination of the local mode, the server 230 may send information to client device 220 to indicate that the local mode can be ended. In some embodiments, when the client device 220 identifies a trigger indicating termination of the local mode, the client device 220 sends information to the server 230 to indicate that the local mode has ended, and that communication between the server 230 and client device 220 can resume. At block 1010, process 1000 includes ending the local mode operation. For example, the client device 220 can end the local mode operation upon receiving the information from the server 230, or upon identifying the trigger.

Figure 11:
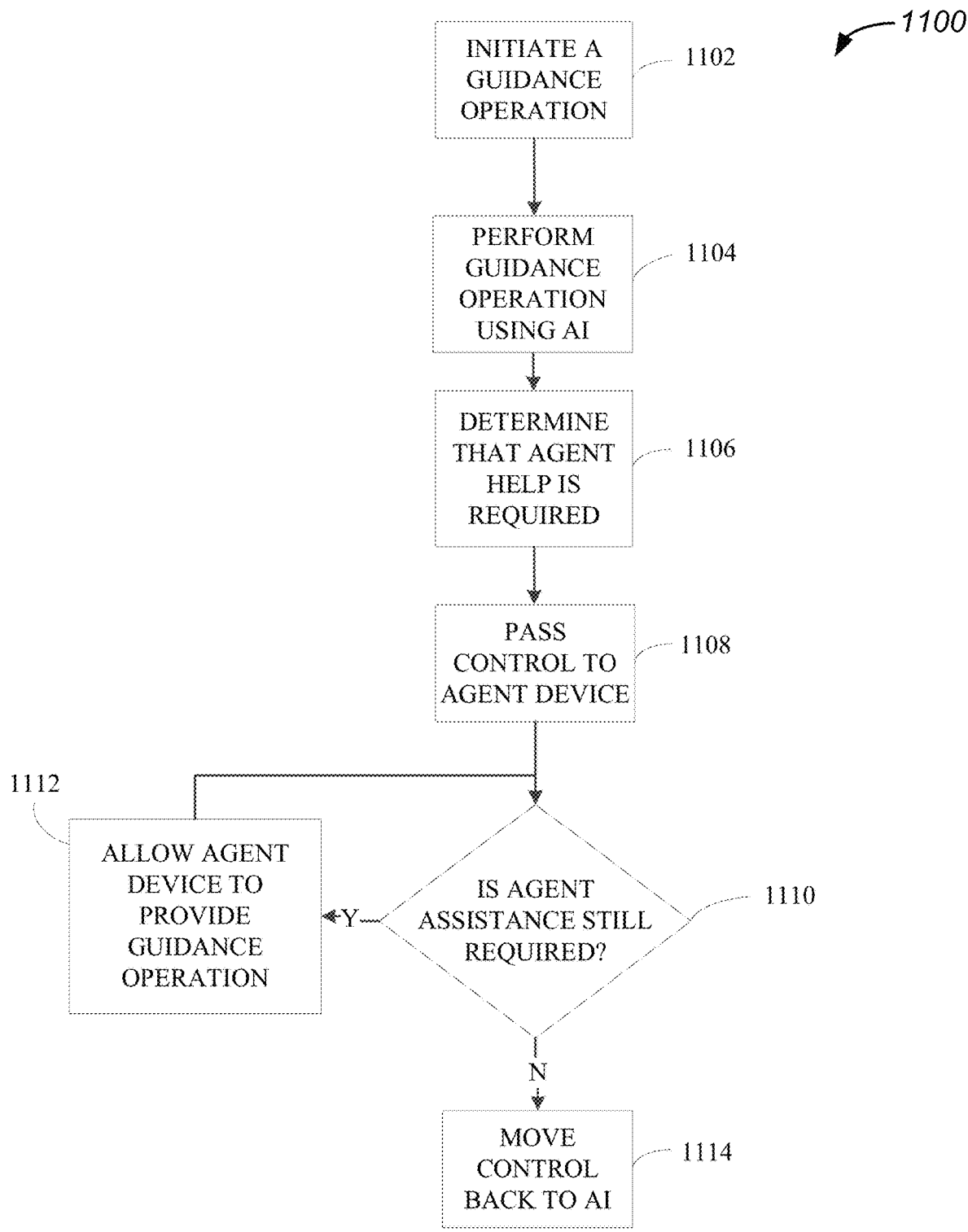
FIG. 11 is a flowchart illustrating a process of transferring control between a server and a live agent, according to some embodiments.

FIG. 11 is a flowchart illustrating an example of a process 1100 for processing transfer of control between a server and a live agent device. In some examples, the transfer of control between a server and a live agent device can be implemented, for example, entirely or partly by an agent engine 716 in server 230. In some examples, the process 1100 may also be implemented partially or wholly by an agent device 240*a*, 240*b*, 240*c* (as used by live agents 250*a*, 250*b*, 240*c*), or a combination of the server and an agent device. Transfer between a live agent device and the artificial intelligence (AI) system 718 in server 230 may occur several times during the course of a guidance mode operation.

At block 1102, process 1100 includes initiating a guidance operation. For example, the guidance operation may include a guided navigation sequence. Although an example with reference to process 1100 describes an example of navigation, the guidance mode operation need not be limited to a navigation sequence. Other examples of guidance operations can include assistance with reading or translating text either from a book, or from posters or signs in the environment of the user of a client device, assistance with identifying vacant seats in a form of public transportation (e.g., a bus, a train, a boat, or other suitable public transportation), help with identifying people in a crowded area, assistance with using mechanical and electrical/electronic appliances, help with shopping, or any other situation in which a visually impaired or otherwise impaired or limited person may need assistance from the AI in the server 230 or an agent using an agent device 240*a*, 240*b*, or 240*c*.

At block 1104, the process 1100 can include performing the guidance mode operation using the AI. The guidance mode operation can include the navigation sequence, in which the navigation engine 706 of the AI system 718 provides guidance mode feedback in the form of navigation instructions (e.g., step by step instructions, directional instructions, or other suitable navigation-related feedback). In embodiments, the server 230 can provide the guidance mode feedback using the AI system 718 without assistance from live agents using live agent devices. The other engines 706, 708, 710, 712, 714, 716 of the AI system 718 may be used to provide other guidance mode operations. As explained previously, the hardware in server 230, comprising the various engines 706, 708, 710, 712, 714, 716, may be sufficient to guide the user 210 of the client device 220 for a certain amount of time. The server 230 hardware can be sufficient because the assisted navigation (or other guidance mode operation) may proceed without any need for manual intervention. Hence, the user 210 (using client device 220) may not communicate with any live agent (using a live agent device) during this time.

At block 1106, process 1100 can include determining that a live agent's help is required. The determination of block 1106 may be performed by the server 230 based on a number of factors or events. In one example, the user 110 may not have reacted to a certain instruction or feedback in a way that was expected by the server 230. For instance, the user 110 may have turned right when the server 230 provided feedback to take a left turn. In another example, the user 210 may not be able to follow instructions or feedback from the server 230 because of some condition in the environment. For instance, a walkway on a road may not exist anymore, a road may be under construction, a storm or other natural even may occur, or other event may occur in the environment. In yet another example, the server 230 may realize that the user does not understand the automated instructions (e.g., as evidenced by the user ignoring feedback provided by the server, the user performing actions that are contrary to feedback provided by the server, verbal feedback provided by the user, or other indication that the user does not understand the instructions).

At block 1108, process 1100 can include passing control to a live agent device. In implementations, the server 230, using agent engine 716, may hand off control to one or more live agent devices. The agent or agents (and their respective device or devices) can be selected intelligently based on several factors. Factors for selecting an agent may include expertise of an agent. For example, an agent may have expertise with a certain condition or impairment, expertise with certain language, expertise with a location in which the client device 220 is located, or other relevant expertise. Expertise of agents can be compared to the reason that agent help was required in the first place, and a match between the help needed and an agent with certain expertise may be performed. For example, if server 230 determines that the user had trouble understanding feedback instructions received from the AI system 718, control may be transferred from the AI system 718 to an agent device of an experienced agent trained to speak slowly with a neutral accent in a particular language. Other factors for selecting an agent can include agent availability, agent years of experience, agent or agents that have been specifically requested by the user, or any other relevant factor. For example, agents may be ranked according to their expertise for a given situation in which an agent is requested. The other factors can be taken into account when a determination of an appropriate agent cannot be readily made. For example, a first agent with the appropriate experience may be unavailable when control is being passed to an agent device. In such as example, another agent that is ranked next behind the first agent and that is available may be selected for assisting the user.

At block 1110, process 1100 can include determining whether live agent assistance is still required. In implementations, the server 230 may periodically make a determination of whether agent help is still required (e.g., every 1 minute, every 2 minutes, every 5 minutes, every 30 minutes, or any other suitable period of time). According to process 1100, when a determination is made that live agent assistance is still required, the live agent may continue to provide assistance using the corresponding agent device at block 1112.

At block 1114, process 1100 can include moving control back to the AI. For example, the server 230 may cause control of the guidance operation to be passed back to the AI system 718 once the live agent session is ended. The server 230 or agent device can end the live agent session upon identifying that agent help is no longer required for the guidance operation. Several events may trigger the end of live agent help. For example, the user may no longer require live help, and he or she may communicate this fact to the live agent (e.g., by verbally saying that agent help is no longer needed, selection of a button or icon, or other suitable communication). The user may communicate to the agent at a given point in time that he or she is ready to move back to automated guidance. In another example, the server 230 can determine that live agent help is no longer required, such as when a user has approached a certain point during the navigation. The process 1100 described in FIG. 11, or parts of the process 1100, may be repeated several times during the course of one guidance session.

As indicated in FIG. 2, server 230 can be in communication with one or more agent devices, such as agent devices 240a, 240b, and 240c. These agent devices 240a, 240b, 240c may display an agent interface, not shown in FIG. 2. In embodiments, at least part of the hardware required for the display of an agent interface can be located at the server 230. In some embodiments, an agent device 240a, 240b, or 240c may comprise hardware required for the agent interface to operate.

Embodiments of the agent interface will be described below, by means of non-limiting examples. An agent interface can be implemented in a variety of ways. For example, the agent interface may be implemented on a display connected to or that is otherwise part of an agent device. In implementations, the display can be part of the agent device. The agent device can access video data, sensor data, and other data, from a client device (e.g., client device 230), directly or through a remote assistance server (e.g., server 230). The agent interface can provide an agent with tools required to assist a user of a client device in a guidance mode operation. Processing required for display on the agent interface may be performed by a computer. Such a computer can be located in various physical or virtual locations, including at the agent device, at the server, or in a cloud-computing environment.

Figure 12:
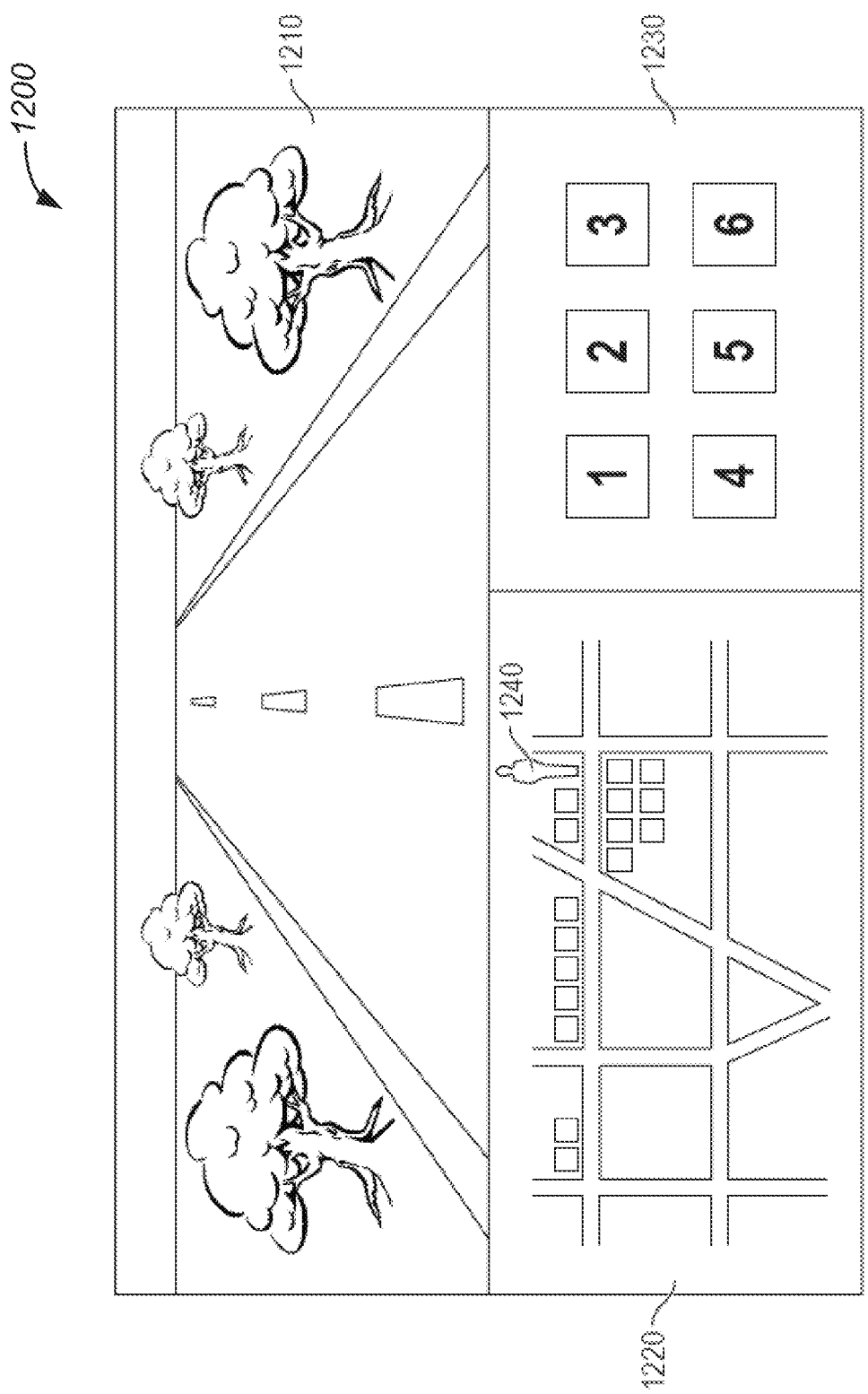
FIG. 12 is a simplified illustration of an example of an agent interface, depicting a video content and a map, according to embodiments.

FIG. 12 provides a simplified illustration of an example of an agent interface 1200, depicting video content and a map. In the figure, agent interface 1200 can include at least three regions, identified as region 1210, region 1220, and region 1230. In some embodiments, agent interface 1200 can include a different number of regions, for example, one, two, or more than three regions.

Region 1210 can provide at least a live video feed with a view of the environment from the perspective of the client device 220. For example, video of the environment captured by the client device 220 may be sent to an agent device (e.g., agent device 240a), over a network, and displayed in region 1210. The video can be directly sent to the agent device, or can be sent indirectly to the agent device through an intermediary, such as the server 230. The live view displayed in region 1210 can provide the agent with a simulated view of the scene the user might be viewing, in real-time or near-real-time. In some embodiments, the agent can be prevented from closing the live view in region 1210 from the agent interface, and the live data remains displayed on the agent interface except when the privacy mode is operational. In some senses, such a view may be a "virtual eye" of the user. Live view as used in the specification should be understood to mean a simultaneous view, or substantially simultaneous view, of events as they happen at the client device 220.

Region 1210 may also include elements in addition to or instead of a live video feed of the user's environment. In one example, region 1210 can display a simulated view that represents how a user with a particular visual impairment sees the scene represented by the video feed. The simulated view can be generated by applying a mask to a live view as described more fully below with reference to FIG. 16. In embodiments, the live video feed can be superimposed or overlaid with labels, and other information. In embodiments, region 1210 can include a compass view or a distance view superimposed on the live video feed. Compass views and distance views, can be used by live agents to enable the agents to provide better assistance to and directions to a user as explained in more detail below.

Region 1220 can include a map object. The map object may include a location indicator 1240 indicating the location of the client device—and hence the user—in real-time or near-real time, based on at least location-related sensor information received from one or more location sensors of the client device 220. The location indicator 1240 can be in the shape of a person or other shape (e.g., a star, a dot, or other suitable shape), and may track the client device 220. For example, the location indicator 120 can track the client device 220 (and user 210) by navigating through the map object as the client device 220 moves with the user in the real world using the location-related sensor information. In embodiments, location data identifying a location of the client device 220 can be retrieved from an agent device. In such embodiments, the agent device may obtain the location data from one or more location sensors in the client device 220.

The map object, with the location indicator, can be used advantageously by the agent to provide guidance feedback to the client device 220 for output to the user 210. For example, the map object can be useful to the agent in providing navigation assistance. For instance, the agent may determine a navigation route using the map object, and can provide navigation instructions to the user 210. The map object can also be useful in locating places of interest for the user. For instance, the agent may suggest to the user 210 venues or objects that are identified using the map object. In some embodiments, places of interest may be displayed on the map object. In some cases, the user 210 may use the client device 220 to request help in finding points of interest. In some cases, the agent or the AI system 718 in the server 230 may suggest points of interest based on a user profile of the user.

The video data, location data, and other data received by the agent device, and in some instances displayed on the agent device, may be synchronized at various points. Sensor data may include data from any of the sensors 348 of the client device 230, such as a location sensor or a position locator sensor, an Estimote sensor, a location Beacon, an iBeacon sensor, or other suitable location sensor), an altimeter, a gyroscope, a magnetic compass, an impact sensor, an accelerometer, an infra-red sensor, an ambient light sensor, a temperature sensor or thermometer, or any other suitable sensor. For example, the server 230 may implement a method to synchronize all received data before sending them to the agent device. Alternatively, or in addition, the agent device may synchronize data, such as captured video data, sensor data, or audio data.

Region 1230 can include several control objects (e.g., selectable icons or buttons) for use by the agent. The control objects can be used by an agent, for example, to alter an aspect of the display in the agent interface 1200, to allow the agent to control aspects of the client device 220, or to perform other functions. In embodiments, the control objects can include a camera object, a video object, a compass button, a distance button, a zoom in button, a zoom out button, a telephone call button, and/or a mask button. In some embodiments, the control objects allow an agent to alter a zoom level of the camera located at the client device. In some implementations, a control object can allow an agent to change a resolution of the video displayed in region 1210 of the agent interface. Features of some examples of these buttons are described further below. In embodiments, one or more of the control objects may be present in other regions of the agent interface 1200 as well. In embodiments, region 1230 may be comprised of several sub-regions, some sub-regions overlapping with other regions.

In some examples, the region 1230 can include a camera object. Selection of a camera object can initiate a transmission of a signal from an agent device 240*a*, 240*b*, 240*c* to the client device 220. Selection of the camera object may be performed by an agent, for example, by pushing, clicking, touching, or otherwise selecting the camera object displayed in region 1230. Upon receiving the signal, the client device 220 can capture an image of a scene (e.g., as viewed by a video capture device 344) and save it at the client device 220. In other embodiments, selection of the camera object may locally, at the agent device, or in the cloud, capture and save an image displayed in region 1210. Whether a control object such as a camera object or a video object is enabled for selection may depend upon the user privacy preferences set at login or identified in the user profile of the user 210.

In some examples, the region 1230 can include a video object. Selection of a video object can cause a signal to be transmitted from an agent device 240*a*, 240*b*, 240*c* to the client device 220. The signal may cause the video capture device 344 on the client device 220 to record a video of a scene as viewed by the video capture device 344. In other embodiments, selection of the video object may locally, at the agent device, or in the cloud, capture and save a video recording from region 1210. In some embodiments, various controls on a video capture device 344 located at the client device 220 may be adjustable from the control region 1230. For example, zoom, exposure, aperture, focal length, or other image capture property of the video capture device 344 on the client device 220, may be adjustable by a live agent using an agent interface.

In some examples, the region 1230 can include a compass button. Selection of a compass button can cause a compass view to be overlaid on the live video feed in region 1210. In some examples, the region 1230 can include a mask button. Selection of a mask button can cause a mask view to be displayed in region 1210. In some examples, the region 1230 may include a distance button. Selection of a distance button may cause a distance view with a scale to be overlaid on the live video feed in region 1210. The compass view, mask view, and distance view will be described further with reference to FIGS. 15, 16, and 17.

In some embodiments, to improve response time or efficiency, an auto mode (or auto-pilot mode) can be implemented by the remote assistance system. The auto mode can be initiated by the agent, and may be implemented in response to agreement by the user. In other aspects, the auto mode may be requested by the user. In auto mode, a set of pre-recorded instructions can be provided through the client device for a certain routine. For example, when the user is walking down a straight sidewalk, an agent may set an auto pilot mode (e.g., upon receiving the user's permission), and the remote assistance server or the client device may provide audible signals that instruct the user to orient in the middle of the crosswalk, and to walk straight down the sidewalk. The auto mode may free up time for the agent to do other tasks, for example to look up information for a next user task while passively following the user. In some examples, an automated audio feedback button can be included among the control objects in region 1230. Selection of an automated audio feedback button can initiate the auto-pilot mode, and may provide automatic audio instructions to the client device 220 for output to the user 210. These instructions can include audio clips that were pre-recorded for repeated use. As other examples, during navigation, at least part of directions to make turns, to walk straight along a street, to wait for public transport, or other navigation feedback instruction, can be recorded and stored in a database. When required, the pre-recorded directions can be accessed by a live agent device when an agent clicks the automated audio feedback button when the auto mode is in operation.

Figure 13:
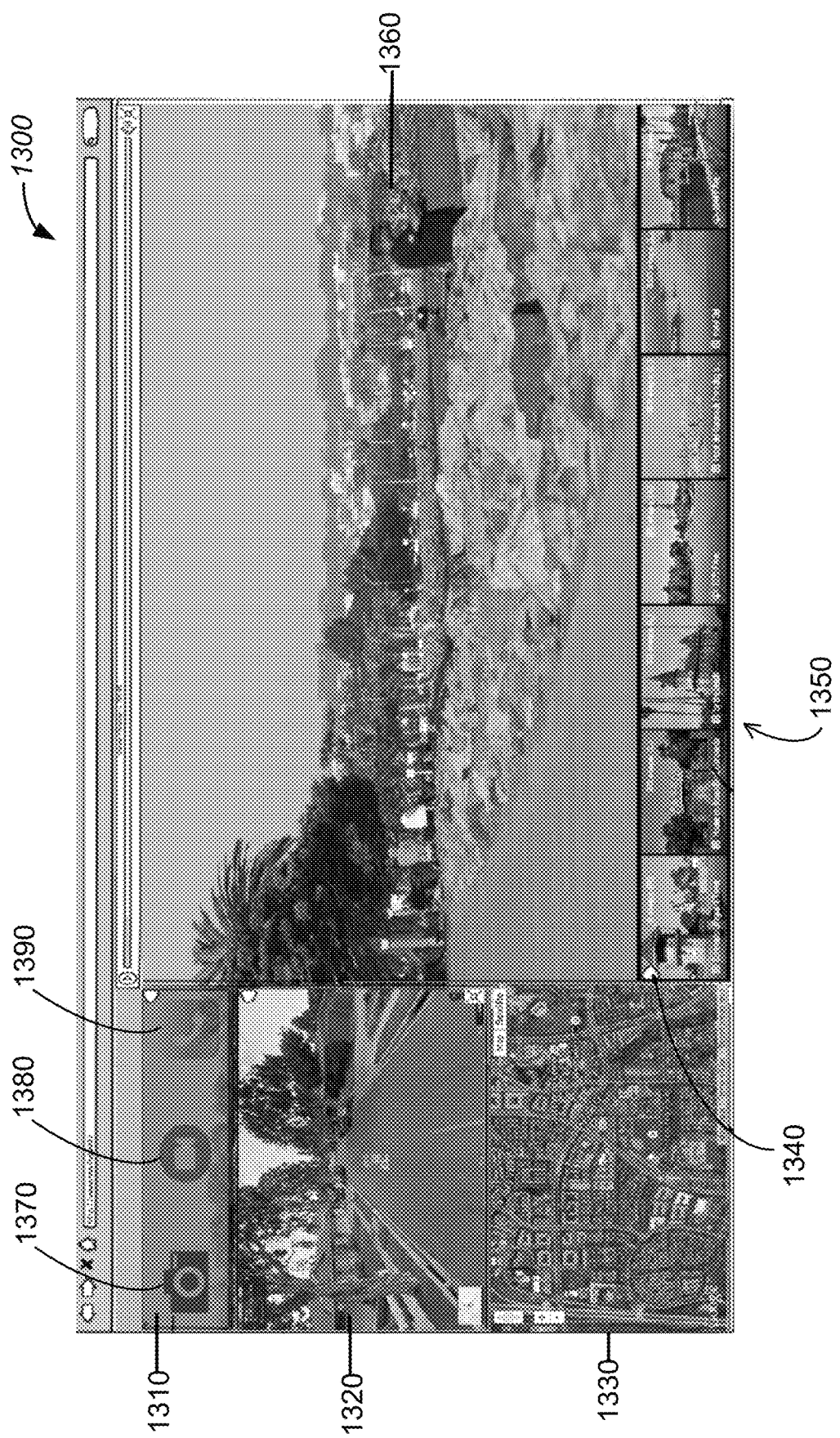
FIG. 13 is an example of an agent interface or dashboard, according to some embodiments.

Various examples of agent interfaces will now be described. FIG. 13 is an example of an agent interface 1300 (or "dashboard"), according to embodiments. Region 1360 illustrates the display of a live video feed illustrating a view from a video capture device of a client device. Region 1330 corresponds to the map object, with a location indicator in the shape of a person indicating a location of the client device on the map object. The orientation of the map object may be readjusted periodically to reflect the direction of motion of the client device. Region 1310 illustrates the region of control objects, including a camera object 1370, a video object 1380, and a phone object 1390. Additionally, agent interface 1300 may comprise regions 1320 and 1350 as shown. Region 1320 can provide a street view of the environment surrounding the client device 220. In some embodiments, the street view shown in region 1320 may be retrieved from the Internet from one or more websites. The street view can be specific to the orientation of the user and updated in real time or near-real time as the user's location and/or orientation changes. Region 1350 can comprise a pictorial list of points of interest in the map object depicted in region 1330. Points of interest can include nearby businesses, objects, or other items that may be of interest to the user. The list may be automatically updated based on the distance between the user and the businesses or objects. A filtering mechanism may be applied to filter the list to provide the most relevant results to the user (e.g., based on the user's profile). The pictorial list can be based on preferences indicated by the user, for example in the user profile. Each of the regions can include a control sub-object that can be used to minimize, maximize, or otherwise alter the display of each region in agent interface 1300. For example, control sub-object 1340, located within region 1350, may be selected to cause region 1350 to be minimized or closed. Some regions in the agent interface 1300, such as region 1360 providing the live video feed, may not be closeable by the agent in some embodiments.

Figure 14:
FIG. 14 is another example of an agent interface or dashboard, according to some embodiments.

FIG. 14 is another example of an agent interface 1400 (or "dashboard"), according to embodiments. Region 1420 illustrates the display of a live video feed showing a view of an environment from the perspective of a video capture device of a client device. In the example shown in agent interface 1400, region 1420 also includes various superimpositions to help the agent guide the user. For example, region 1420 includes labels for features within the environment (tab 10 and tab 18), and an overlaid address in the top-left corner of the region 1420. Region 1420 also includes mask button 1450 control object, which can be selected by an agent to turn on and off a mask view.

In some implementations, in addition to or in place of the mask button, the control region 1420 can also include a "slider" (not shown in FIG. 14) to further control the mask view. An indicator on the slider can be moved back and forth to simulate the worsening or improving of visual conditions, as seen by the agent. For example, a user with retinitis pigmentosa may have limited or no peripheral vision. Vision may be limited to a central "tunnel." As the indicator on the slider is moved, this central tunnel can be increased or decreased in size. This way, in some implementations, the agent can attempt to match the vision of a specific user with retinitis pigmentosa. Further details of the mask view are explained further below.

Region 1430 corresponds to the map object, with a location indicator 1470 of the client device depicted as a solid circle. Region 1410 illustrates a region of control objects, including various objects to aid the agent. In the example shown, an emergency control button 1480, a battery level indicator 1485 reflecting the battery level of the client device, a time indicator, a weather indictor 1490 with weather information, an external services control button 1495 to access external services (e.g., a taxi, a restaurant, or other external service), and a camera control object are displayed. One of ordinary skill will appreciate that many other objects can be provided within the agent interface 1400.

Region 1440 can include a pictorial list of points of interest in the map region depicted in 1330. Control object 1460, comprising a search bar may be used by the agent to search for and retrieve user profiles. Such user profiles of the user that an agent is guiding may be used to provide information regarding the user's impairments and preferences. In some embodiments, region 1440 may comprise a list of regular destinations for the user determined using the user's profile.

Figure 15:
FIG. 15 is an illustration of example of video content with a compass view and a distance view, as seen in an agent interface, according to some embodiments.

FIG. 15 is an illustration of example of a live video feed view 1500 (e.g., shown in any of regions 1210, 1360, or 1420 discussed herein) with both a compass view 1520 and a distance view 1510 overlaid on a video feed, as seen in an agent interface, according to an embodiment. The compass view 1520 can be controlled or turned on and off by the agent using a compass button control object, as previously described. The live video feed view 1500 can include a live video received by an agent device from a client device (as captured by a video capture device of the client device).

In the example depicted in FIG. 15, the user of the client device may want to enter the store shown in the picture. A compass view 1520 can comprise a clock-face as shown in FIG. 15. The agent can reference a portion of the clock-face to indicate which direction the user should travel. For example, the agent may tell the user that the entrance to the store is at a 12 o'clock orientation from the user's current viewing perspective (as viewed using the client device). A distance view 1510 can include can a ruler with measurements in several units, as shown in FIG. 15. Units can be tailored to the specific user, based on, for example information in the user's profile, or based on inferences made by a learning engine in the server. In the example shown, apart from distance measurement in feet, the distance view 1510 can also provide distance in number of steps, which in embodiments, may be tailored to the user based on the amount of ground covered by each step by the user. The distance view 1510 can also include the estimated time required to reach the destination (the store), and/or the estimated number of steps required to reach the destination. Such estimates can be calculated based on data from sensors on the client device such as an accelerometer, a GPS, and a gyroscope.

An agent with the video feed view 1500 displayed on an agent interface, may be in the process of providing guidance feedback to the user. The agent may provide directions to the user using views 1510 and 1520 as guides, which may assist the agent in providing useful verbal feedback to the user. For example, the agent may ask the user to turn to his or her "2 o'clock position," and "walk 15 steps to reach a revolving door." Views 1510 and 1520 may remove some of the guesswork and uncertainty from directional feedback provided from an agent to a user of the client device. Removing uncertainty may be critical for visually impaired or otherwise impaired or limited users.

In some embodiments, the client device can alert the user when the user turns to face the correct position to pursue a next step on the compass view. For example, the agent can ask the user to turn to a 10 o'clock position or orientation. The user may begin turning, for example, in small increments, until the client device alerts the user that he or she has reached the required position or orientation. The correct position or orientation can be provided to the client device in various ways. For example, the server (e.g., server 230) can intelligently calculate the direction a user needs to face at a given step and communicate it to the client device. In some embodiments, the agent guiding the user may input the direction a user should be facing to the client device. The agent can input the direction, for example, "100 degrees to the left" through the agent interface to the agent device, which may send the direction to the client device. In some embodiments, the agent device can send the direction to the server, which in turn may send it to the client device.

The client device can continually track its direction, using for example, a gyroscope sensor in the client device. Once the client device receives the final position from the agent or from the server, the client device can determine the final required position based on the input. The client device can continue to track its own orientation, and hence the orientation of the user, until the user faces the correct direction. When the user faces the correct direction, the client device may notify the user (e.g., through audio feedback, haptic feedback, or other suitable feedback) that the user has reached the correct orientation.

Figure 16:
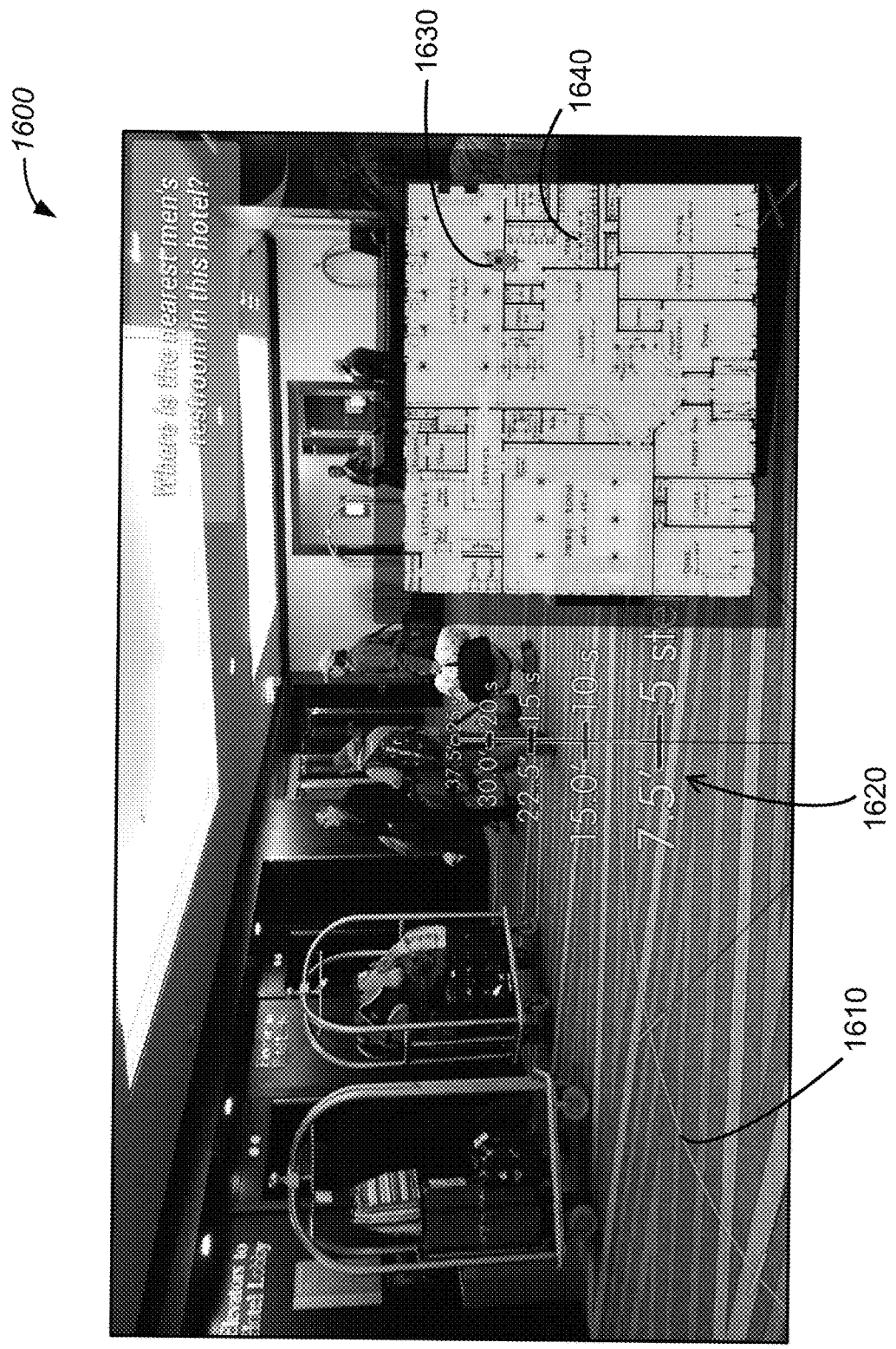
FIG. 16 is an illustration of an example of video content as seen in an agent interface, according to embodiments.

FIG. 16 is an illustration of an example of video content region 1600 of an agent interface showing a live video feed, according to embodiments. FIG. 16 illustrates how data obtained from a computer with access to the video feed can supplement the displayed live video. Such a computer can be implemented, for example, at the server, or at an agent device. In the example shown in FIG. 16, a user may be trying to find the nearest restroom in the hotel where the user is located. The video content region 1600 displayed on the agent interface can include a compass view 1610 and a distance view 1620. In some embodiments, the video content region 1600 can also include a layout plan view of the hotel identifying the location of the restroom. In embodiments, a map of the layout plan view may be retrieved from an external source by the server and made available to the agent device. In embodiments, the location of the restroom may be identified by the server through crowdsourcing (e.g., a previously identified location of the restroom by one or more other client devices in communication with the server).

Several of the features described with reference to agent interface may be used in conjunction with each other. For example, a compass view and a distance view can be used in conjunction with the mask view by an agent assisting a visually impaired user. Further, facial recognition techniques implemented at the agent device or at the server may also assist an agent in identifying people in the environment of the user. In some embodiments, the recognized faces could be matched up to their social profiles using external services and Internet web sites.

Figure 17:
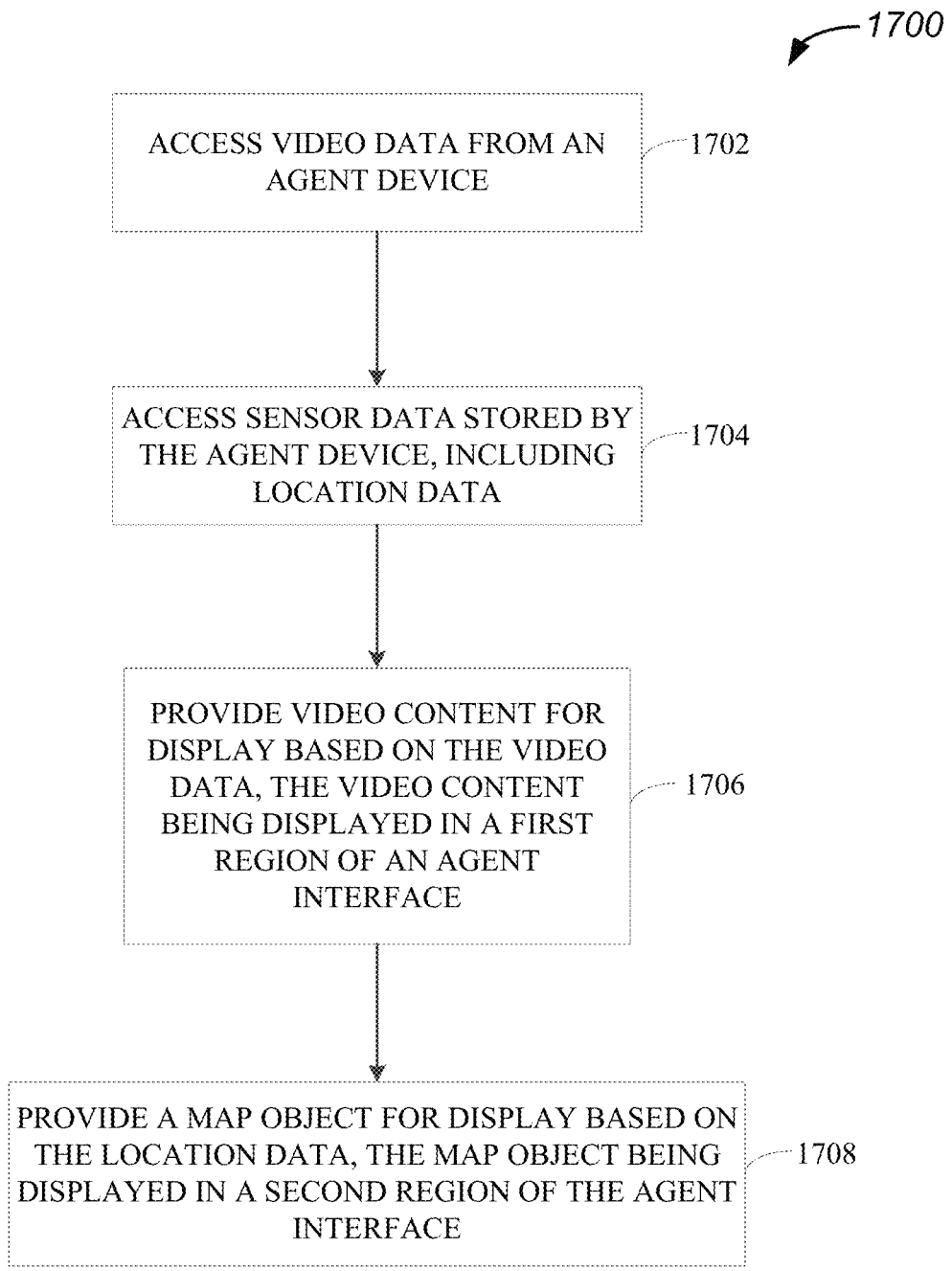
FIG. 17 is a flowchart illustrating an example of a process of providing video content and a map object for display in an agent interface, according to embodiments.

FIG. 17 is a flowchart illustrating an example of computer-implemented process 1700 for providing an agent interface. Process 1700 can be used to provide an agent interface such as a dashboard, which may be used by an agent for providing remote assistance to visually impaired users, or users with other impairments or limitations. As mentioned previously, although depicted sequentially, processes shown in various blocks may not occur sequentially in time. They may occur simultaneously, or in a different order from the order shown in the flowchart.

At block 1702, process 1700 can include accessing video data from an agent device. The video data includes images of an environment in which a client device is located. The video data can also include metadata, such as a timestamp related to when a frame was acquired, a precision indicator, a resolution of the video, and the like. In implementations, the video data can be accessed from the agent device by a processor within the agent device. In other implementations, the video data may be accessed by a processor located elsewhere, such as in server 230. The video data may provide the required input for a live video feed window or region on the agent interface dashboard.

At block 1704, process 1700 can include accessing sensor data stored by the agent device, including location data. In implementations, location coordinates may be provided by a location sensor of the client device. The agent device may access the location coordinates from the client device. In some embodiments, synchronization techniques can be applied in block 1704 to match received video data and received sensor data in time.

At block 1706, process 1700 can include providing video content based on the video data for display in a first region of the agent interface. The video content can also be provided for display based on any sensor data. The agent interface may be displayed in a display device connected to the agent device. In some implementations, the display device may be part of the agent device. The video content can provide a live view of the environment from a perspective of the client device, and hence from the point of view of a user of the client device. Some examples of the video content are illustrated in FIG. 12-FIG. 16, as discussed above. The live video feed may be available to an agent, thereby helping the agent assist the user from the perspective of the client device.

At block 1708, process 1700 can include providing a map object based on the location data, the map object being displayed in a second region of the agent interface. In implementations, this location data may represent the location of the client device. Consequently, the map object may indicate a location of the user on the map. Such location data can be sensed by a location sensor on the client device periodically or continuously, and may be sent by the client device to the agent device. By viewing at least the live view and the map object on the agent interface simultaneously or substantially simultaneously, the agent may be able to pay attention to the visually impaired user's surroundings. Other regions and objects can be displayed in the agent interface, as discussed above with reference to FIG. 12-FIG. 16.

Figure 18:
FIG. 18A is an illustration of a mask view, according to some embodiments.
FIG. 18B is an illustration of a mask view as displayed in an agent interface, according to embodiments.
Figure 18B:
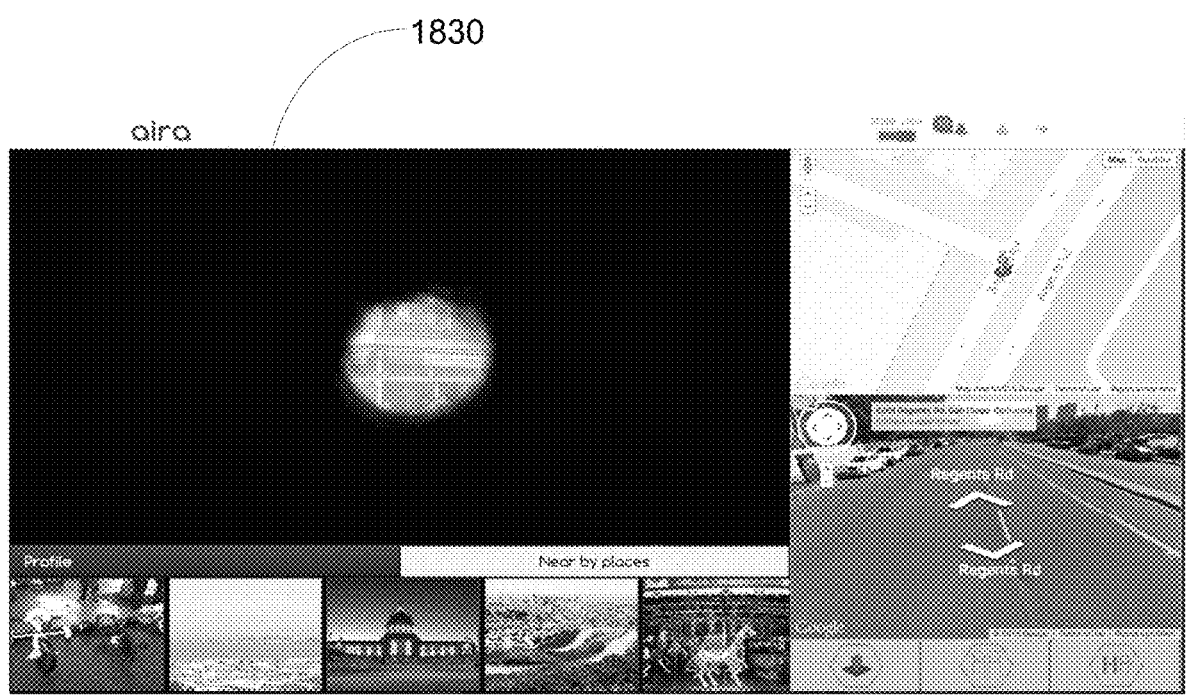

FIG. 18A and FIG. 18B illustrate examples of a mask view feature that can be available to supplement the live video feed displayed in an agent interface, according to embodiments. The mask view feature works on a video stream. For example, the mask view feature utilizes a camera of a client device, and places filters on the incoming video stream to simulate the visual impairment of the user of the client device. Each eye disease or condition has its own filter to simulate the eye's degradation.

FIG. 18A illustrates the difference between a regular view 1810 and a mask view 1820. Such a mask view 1820 may be turned on and off my means of control buttons or control objects available on the agent interface, such as mask button 1450 shown in FIG. 14. In FIG. 18A, two pictures from two example live views are shown in regular view 1810 and mask view 1820. Regular view 1810 may be a regular live video feed, such as the live video feed displaying video data captured by a video capture device of the client device. Mask view 1820 can represent a live view with the masking feature turned on.

The mask view 1820 can be designed to provide an agent with a simulated view of a visually impaired user, who may not be completely blind. In the example shown in FIG. 18A, the user being assisted by an agent may have a condition called retinitis pigmentosa. Because of the retinitis pigmentosa condition, the user may have reasonably good vision in a small region straight toward the center of gaze, but very weak or no peripheral vision. The agent can turn on the mask view for a simulated view of what the user may be seeing due to the retinitis pigmentosa condition. Mask view 1820 represents a simulated view of the retinitis pigmentosa condition with a retinitis pigmentosa-related mask applied to the video content. In some embodiments, the agent can then use the compass view to ask the user to turn a certain number of degrees, to bring an object of interest into a region of the user's good vision. In other aspects, the simulated view can be used by the agent to identify objects in a way that they may be seen by the user. In some embodiments, the mask can be selectively applied to the left or right of the live video feed based on which eye/eyes of the user is/are impaired.

FIG. 18B is an illustration of another example of a mask view in an agent interface, according to embodiments. Region 1830 provides a simulated view of the user with a visual condition. The agent can toggle between a live view and the mask view on the interface by using a mask control button.

Figure 19:
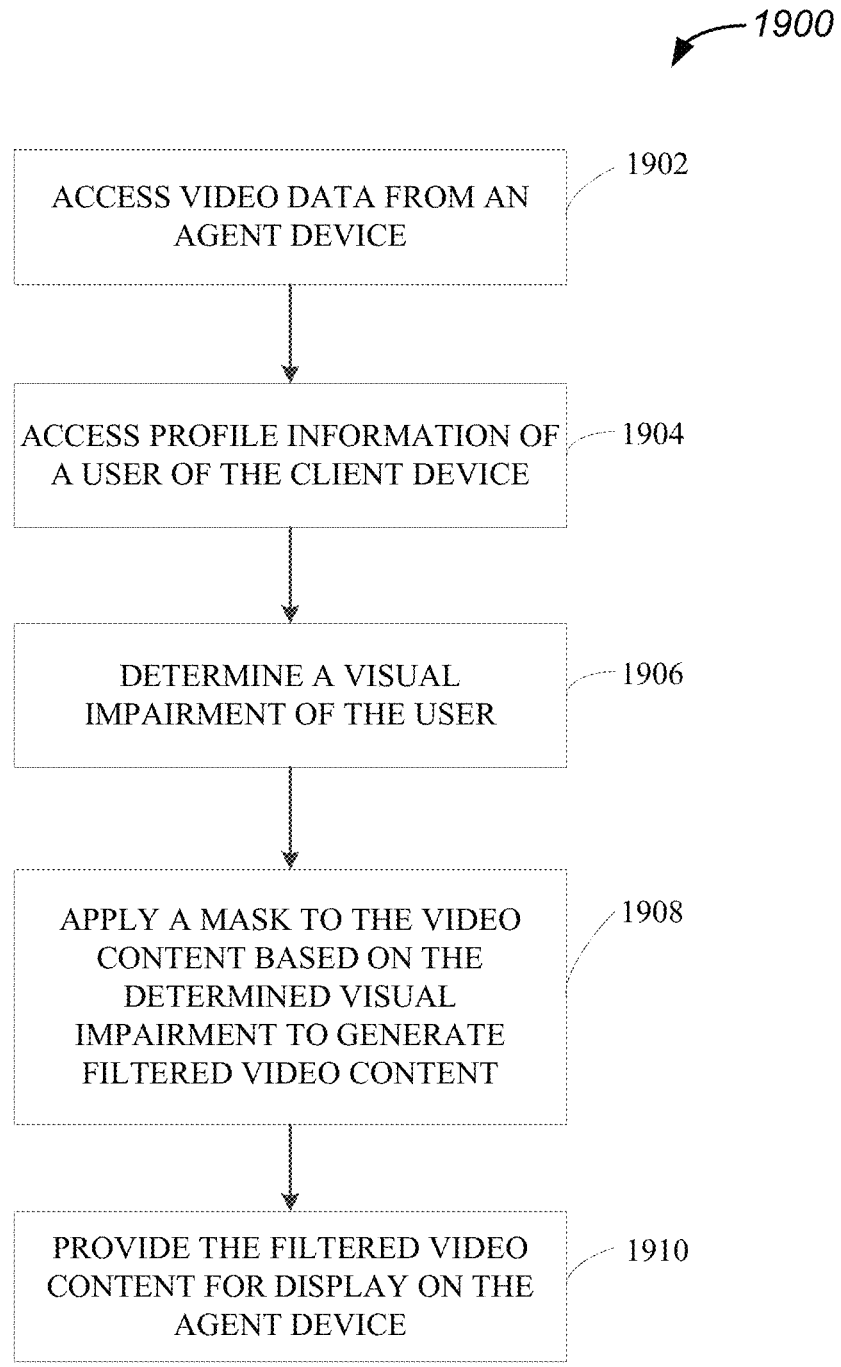
FIG. 19 is a flowchart illustrating an example of a process of providing a mask to generate filtered video content, according to some embodiments.

FIG. 19 is a flowchart illustrating a process 1900 of providing a mask to generate filtered video content, according to an embodiment. At block 1902, the process 1900 includes accessing video data from an agent device. The video data includes images of an environment in which a client device is located. At block 1904, the process 1900 includes accessing profile information of a user of the client device. Such a user profile can include information regarding one or more visual impairments of the user. At block 1906, the process 1900 includes determining a visual impairment of the user. The visual impairment can be determined by the server 230 or an agent device 240a, 240b, 240c based on the visual impairment information in the user profile of the user of the client device. Based on the determined visual impairment, the appropriate mask to be applied to the video data can be selected. Such a mask may be implemented on a computer using transformation methods. In implementations, the filter may comprise a fixed base component and a variable component. The variable component may be used to simulate a worsening of the visual condition. The variable component can be added to the filter as the mask slider on the agent dashboard is manipulated. At block 1908, the process 1900 includes applying the mask to the video content based on the determined visual impairment to generate filtered video content. The resulting filtered video content may be representative of the visual impairment of the user. At block 1910, the process 1900 includes providing the filtered video content for display on the agent device.

A list of visual and other impairments or limitations and their causes may be maintained in memory at the agent device or the server. A list of visual impairments can include head injury, glaucoma, retinal detachment, hypertensive retinotherapy, cataract, age-related macular degeneration, diabetic retinopathy, retinal vascular occlusion, stroke overview, optic neuritis, chlorine poisoning, strabismus, intracranial hemorrhage, vertebrobasilar circulatory disorder, subarachnoid hemorrhage, brain aneurysm, Tay-Sachs disease, chemical poisoning, basal cell nevus syndrome, or Ito syndrome.

In some embodiments, feedback provided to the user 210 through the client device 220 can be provided as tonal feedback, instead of or in addition to verbal or haptic feedback. In such embodiments, an agent viewing the agent interface can provide verbal or gesture feedback to assist the user in the guidance mode. The agent interface may display video data in a live view (with a live video feed) and location data of the client device on a map. The feedback from the agent can be converted to a tone that the user (e.g., a visually impaired user) may recognize. The tonal feedback can be generated at the agent device and then transmitted to the client device, in some embodiments through the server. In embodiments, the tonal feedback may be generated at the client device.

In some examples of tonal feedback, specific tones may correspond to specific commands. Tones may be distinguished by an intensity or volume of sound, frequency of sound, a tone length, a gap between successive tones, timbre, and the like. A list of commands that may be communicated using tonal commands include, for example, veering to the left of right by a certain angle, walking straight ahead a certain number of feet, stepping right or left, stopping, turning around, or any other command that can be communicated using a tonal command. For example, the user 110 may walk across the street on the path 140 shown in FIG. 1. Once the user 110 reaches the other side of the street, two short tonal commands (two beeps) can indicate to the user to turn in a 2 o'clock direction to continue down the path 140 along the sidewalk. An intense, high volume tonal command can be sent to the client device 120 when the user 110 reaches the construction work 160 to indicate to the user 110 to avoid the obstruction. Once the user 110 reaches the destination 130, a long tone (e.g., 3 seconds) can be communicated to the client device 120 to indicate to the user 110 that the destination 130 has been reached. The user 110 can be educated with the different commands that correspond to the different tones so that the user 110 is aware which tones correspond to which commands. In some examples, tones can also be used to indicate a match when a user is trying to find objects, to countdown time to a walk signal, to indicate battery level of the client device, to indicate signal strength received by the client device, or to indicate obstructions or dangers.

Figure 20:
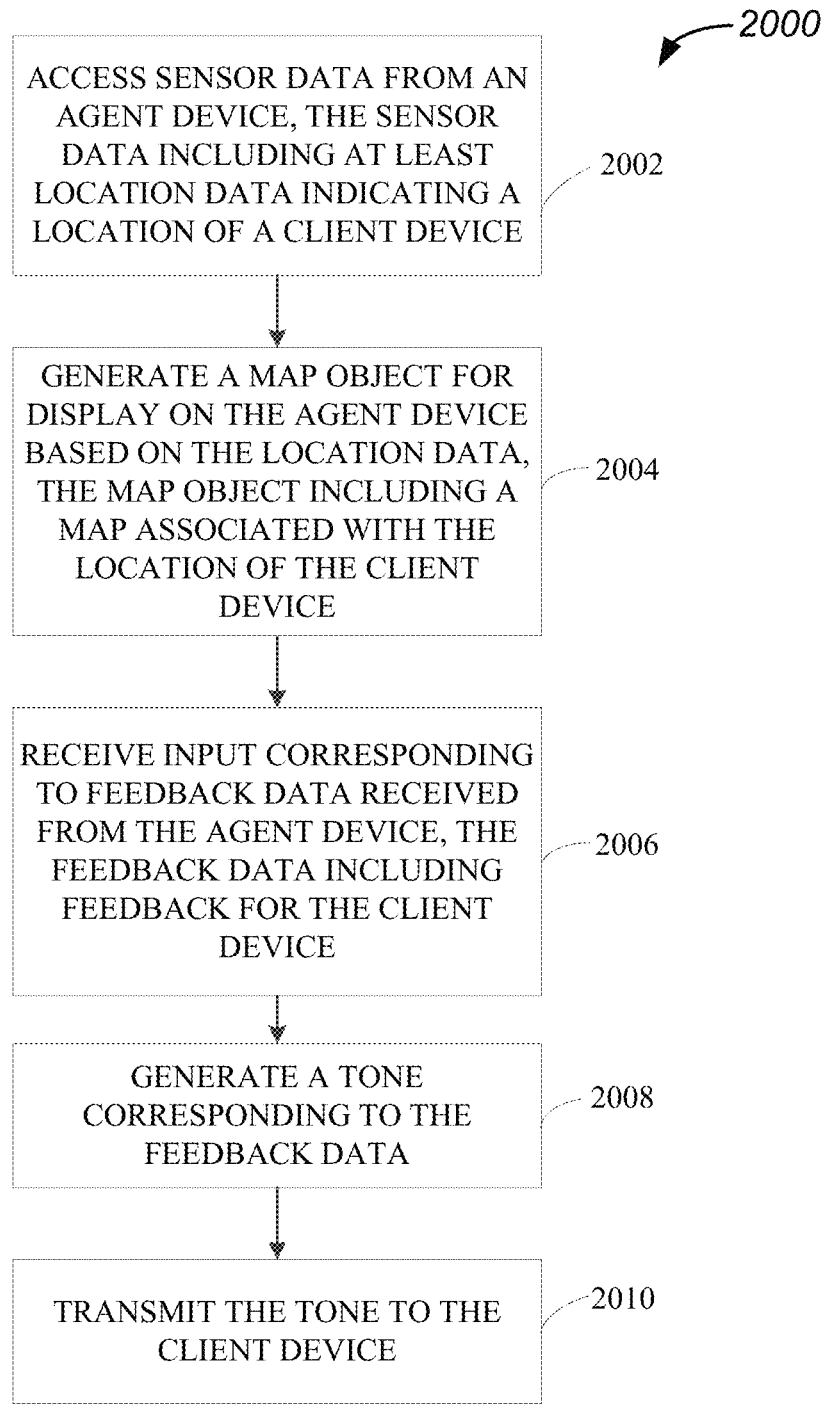
FIG. 20 is a flowchart illustrating an example of a process of providing tonal feedback corresponding to a feedback data, according to some embodiments.

FIG. 20 is a flowchart illustrating an example process 2000 for providing tonal feedback. At block 2002, process 2000 includes accessing sensor data from an agent device. For example, the sensor data may be stored by the agent device. The sensor data can include at least location data indicating a location of a client device. At block 2004, process 2000 includes generating a map object for display on the agent device based on the location data. The map object can include a map associated with the location of the client device. At block 2006, process 2000 includes receiving input corresponding to feedback data received from the agent device. The feedback data can include feedback for the client device from a live agent. At block 2008, process 2000 includes generating a tone corresponding to the feedback data. A tone can be generated based on a predefined table of tones, which in embodiments, may be adapted to various users an situations. At block 2010, process 2000 includes transmitting the tone to the client device. As mentioned, the example flow illustrated in flowchart 2000 may be performed at one or more processors, including at processors on the agent device, server, or the client device, or a combination.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A method of providing remote assistance for visually-impaired users, the method comprising:
   accessing video data from an agent device, the video data including images of an environment in which a client device is located;
   accessing sensor data stored by the agent device, the sensor data including at least location data indicating a location of the client device;
   providing video content for display based on the video data, the video content being displayed in a first region of an agent interface, wherein the video content provides a live view of the environment from a perspective of the client device;
   providing a map object for display based on the location data, the map object being displayed in a second region of the agent interface, wherein the map object includes a map associated with the environment and a location indicator providing a location of a client device on the map; and
   overlaying a distance view over the video content, the distance view displaying at least one or more of a distance or a number of steps from the client device to an object located in the environment.

2. The method of claim 1, further comprising providing one or more control objects for display, the one or more control objects including at least one or more of a camera object or a video object, wherein selection of the camera object initiates transmission of a first signal to the client device, the first signal causing a camera on the client device to capture an image, and wherein selection of the video object initiates transmission of a second signal to the client device, the second signal causing the camera on the client device to record a video.

3. The method of claim 1 further comprising overlaying a compass view over the video content, the compass view displaying a number of degrees from a perspective of the client device to an object located in the environment.

4. The method of claim 1 further comprising providing a user profile icon for display, wherein selection of the user profile icon causes user profile information to be displayed.

5. The method of claim 1 further comprising providing a filtered video content for display, wherein the filtered video content is in a format representative of a visual impairment of a user.

6. The method of claim 5 further comprising providing a slider control object for display, wherein the slider control object varies a variable component of the filtered video content.

7. A system for providing remote assistance for visually-impaired users, the system comprising one or more processors configured to:
   access video data from an agent device, the video data including images of an environment in which a client device is located;
   access sensor data stored by the agent device, the sensor data including at least location data indicating a location of the client device;
   provide video content for display based on the video data, the video content being displayed in a first region of an agent interface, wherein the video content provides a live view of the environment from a perspective of the client device;
   provide a filtered video content for display, wherein the filtered video content is in a format representative of a visual impairment of a user; and
   provide a map object for display based on the location data, the map object being displayed in a second region of the agent interface, wherein the map object includes a map associated with the environment and a location indicator providing a location of the client device on the map.

8. The system of claim 7 wherein the one or more processors are further configured to provide one or more control objects for display, the one or more control objects including at least one or more of a camera object or a video object, wherein selection of the camera object initiates transmission of a first signal to the client device, the first signal causing a camera on the client device to capture an image, and wherein selection of the video object initiates transmission of a second signal to the client device, the second signal causing the camera on the client device to record a video.

9. The system of claim 7 wherein the one or more processors are further configured to overlay a compass view over the video content, the compass view displaying a number of degrees from a perspective of the client device to an object located in the environment.

10. The system of claim 7 wherein the one or more processors are further configured to overlay a distance view over the video content, the distance view displaying at least one or more of a distance or a number of steps from the client device to an object located in the environment.

11. The system of claim 7 wherein the one or more processors are further configured to provide a user profile icon for display, wherein selection of the user profile icon causes user profile information to be displayed.

12. The system of claim 7 wherein the one or more processors are further configured to provide a slider control object for display, wherein the slider control object varies a variable component of the filtered video content.

13. A non-transitory computer-readable memory storing a plurality of instructions executable by one or more processors, the plurality of instructions comprising:
   instructions that cause the one or more processors to access video data from an agent device, the video data including images of an environment in which a client device is located;
   instructions that cause the one or more processors to access sensor data stored by the agent device, the sensor data including at least location data indicating a location of the client device;
   instructions that cause the one or more processors to provide video content for display based on the video data, the video content being displayed in a first region of an agent interface, wherein the video content provides a live view of the environment from a perspective of the client device; and
   instructions that cause the one or more processors to provide a map object for display based on the location data, the map object being displayed in a second region of the agent interface, wherein the map object includes a map associated with the environment and a location indicator providing a location of the client device on the map; and instructions that cause the one or more processors to overlay a compass view over the video content, the compass view displaying a number of degrees from a perspective of the client device to an object located in the environment.

14. The non-transitory computer-readable memory of claim 13 further comprising instructions that cause the one or more processors to provide one or more control objects for display, the one or more control objects including at least one or more of a camera object or a video object, wherein selection of the camera object initiates transmission of a first signal to the client device, the first signal causing a camera on the client device to capture an image, and wherein selection of the video object initiates transmission of a second signal to the client device, the second signal causing the camera on the client device to record a video.

15. The non-transitory computer-readable memory of claim 13 further comprising instructions that cause the one or more processors to overlay a distance view over the video content, the distance view displaying at least one or more of a distance or a number of steps from the client device to an object located in the environment.

16. The non-transitory computer-readable memory of claim 13 further comprising instructions that cause the one or more processors to provide a user profile icon for display, wherein selection of the user profile icon causes user profile information to be displayed.

17. The non-transitory computer-readable memory of claim 13 further comprising instructions that cause the one or more processors to provide a filtered video content for display, wherein the filtered video content is in a format representative of a visual impairment of a user.

* * * * *